(12) United States Patent
Walley et al.

(10) Patent No.: US 8,390,249 B2
(45) Date of Patent: Mar. 5, 2013

(54) BATTERY WITH INTEGRATED WIRELESS POWER RECEIVER AND/OR RFID

(75) Inventors: John Walley, Ladera Ranch, CA (US); Jeyhan Karaoguz, Irvine, CA (US); Ahmadreza (Reza) Rofougaran, Newport Coast, CA (US); Nambirajan Seshadri, Irvine, CA (US); Reinier Van Der Lee, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 400 days.

(21) Appl. No.: 12/793,458

(22) Filed: Jun. 3, 2010

(65) Prior Publication Data

US 2011/0127954 A1    Jun. 2, 2011

Related U.S. Application Data

(60) Provisional application No. 61/264,925, filed on Nov. 30, 2009.

(51) Int. Cl.
*H02J 7/00* (2006.01)
*G05B 11/01* (2006.01)
*G08C 19/12* (2006.01)

(52) U.S. Cl. .................. 320/108; 340/12.51; 340/13.26; 320/106

(58) Field of Classification Search .................... 320/108
See application file for complete search history.

(56) References Cited

U.S. PATENT DOCUMENTS

| | | | |
|---|---|---|---|
| 2002/0000788 A1* | 1/2002 | Ostergaard et al. | 320/128 |
| 2005/0095498 A1 | 5/2005 | Silverman | |
| 2006/0038572 A1 | 2/2006 | Philbrook | |
| 2006/0139168 A1* | 6/2006 | Pratt et al. | 340/539.22 |
| 2006/0145660 A1* | 7/2006 | Black et al. | 320/108 |
| 2006/0178170 A1* | 8/2006 | Chung et al. | 455/572 |
| 2009/0096413 A1* | 4/2009 | Partovi et al. | 320/108 |
| 2009/0187495 A1 | 7/2009 | Bertness | |
| 2009/0212781 A1 | 8/2009 | Bertness | |

FOREIGN PATENT DOCUMENTS

| | | |
|---|---|---|
| WO | 04061887 A1 | 7/2004 |
| WO | 08118477 A1 | 10/2008 |

OTHER PUBLICATIONS

"WiTricity: Wireless Electricity", Oct. 2009, 29 pp.
Andre Kurs, et al., "Wireless Power Transfer via Strongly Coupled Magnetic Resonances", Science, Jul. 6, 2007, pp. 83-86, vol. 317.
Partial European Search Report; EP Application No. EP 10 01 4990; Apr. 13, 2011; 5 pages.

* cited by examiner

*Primary Examiner* — M'Baye Diao
(74) *Attorney, Agent, or Firm* — Garlick & Markison; Edward J. Marshall

(57) ABSTRACT

A battery includes one or more rechargeable cells, a wireless power coil, a battery charger circuit, and may further include an RFID module. The wireless power coil is operable to generate an AC voltage from a wireless power electromagnetic field. The battery charger circuit is operable to generate a battery charge voltage from the AC voltage in accordance with a battery charge control signal and, when enabled, to charge the one or more rechargeable cells via the battery charge voltage. If the battery further includes the RFID module, it is operable to generate the battery charge control signal and communicate with a wireless power transmitter device.

20 Claims, 25 Drawing Sheets

BATTERY WITH INTEGRATED WIRELESS POWER RECEIVER AND/OR RFID

This patent application is claiming priority under 35 USC §119 to a provisionally filed patent application entitled WIRELESS POWER SYSTEMS AND METHODS, having a provisional filing date of Nov. 30, 2009, and a provisional Ser. No. of 61/264,925.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates to power conversion and more particularly to wireless power conversion and supporting communications thereof.

2. Description of Related Art

The concept of wireless power (i.e., powering a device without an electrical power cord) has been around for a while and has recently been commercialized. In addition, there are a couple of on-going standards discussions (WPC—wireless communication alliance and CEA—consumer electronics association) to standardize wireless power systems.

Current commercially available wireless power products include a transmit unit, a receive unit, and a bidirectional control channel. In these products, the primary method of energy transfer is inductive coupling, but some lower power applications may include solar energy transfer, thermo-electronic energy transfer, and/or capacitive energy transfer. To use these products, the receive unit is a separate unit that must be coupled to a device that is to be wirelessly powered. Thus, the device itself cannot be wirelessly powered without the receive unit coupled to it.

To develop these products, effort has been spent on inductive power transfer, closed loop systems, and multiple load support. In the area of inductive power transfer, effort has been spent on optimizing the tuning the transmit and receive circuits (each of which includes a single inductor) for resonance, efficiency, and/or thermal issues, detecting loads, turning off the inductive power transfer, coil alignment, magnetic alignment, lower phantom power, Class D, E power transmitters with load compensation, antenna design, and coil switching. In the area of multiple load support, effort has been spent on power sharing and tuning, control channel multi-access, and collision avoidance.

In the area of closed loop systems, effort has been spent on regulating the transmit power, the transmit resonance, alignment to maximize safety and/or power transfer using a particular control channel protocol (e.g., backscatter, IrDA, or Bluetooth). As such, as long as the receive unit and transmit unit are from the same vendor using the same communication protocol for the control channel, wireless power transfer can occur. While the above referenced standards organization are attempting to establish standards regarding the control channel protocol, currently, vendors are free to use whatever protocol they chose, making compatibility issues between different vendors' wireless power products.

While effort has been spent to commercialize wireless power systems, there is still significant effort needed to make cost-effective and/or feature rich wireless power systems.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
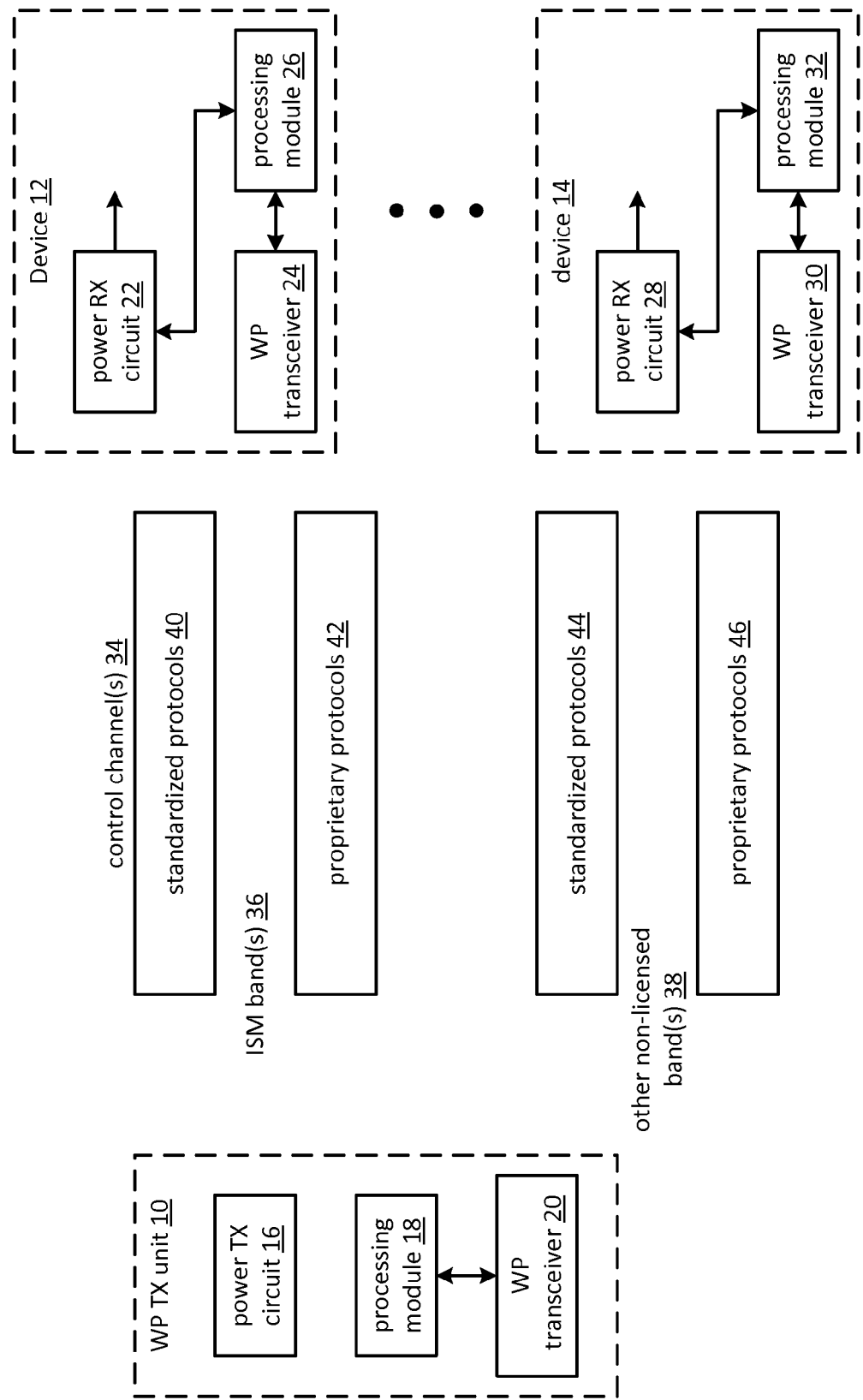
FIG. 1 is a schematic block diagram of an embodiment of a wireless power system in accordance with the present invention.

FIG. 1 is a schematic block diagram of an embodiment of a wireless power system that includes a wireless power (WP) transmit (TX) unit 10 and one or more devices 12-14. The WP TX unit 10 includes a processing module 18, a WP transceiver 20, and a power TX circuit 16. Each device 12-14 includes a WP receive (RX) circuit 22, 28, a processing module 26, 32, and a WP transceiver 24, 30. The device 12-14 will most likely include a plurality of other components depending on its desired functionality. For example, the device 12-14 may be a cell phone, a personal audio/video player, a video game unit, a toy, etc. and includes the corresponding circuitry.

The processing modules 18, 26, 32 of the WP TX unit 10 and in each of the devices 12-14 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 18, 26, 32 may have an associated memory and/or memory element, which may be a single memory device, a plurality of memory devices, and/or embedded circuitry of the processing module 18, 26, 32. Such a memory device may be a read-only memory, random access memory, volatile memory, non-volatile memory, static memory, dynamic memory, flash memory, cache memory, and/or any device that stores digital information. Note that if the processing module 18, 26, 32 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 18, 26, 32 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 18, 26, 32 executes, hard coded and/or operational instructions corresponding to at least some of the steps and/or functions illustrated in FIGS. 1-28.

The WP TX unit 10 communicates with the WP transceivers 24, 30 of the devices 12-14 via one or more control channels 34 that use one or more frequencies in the ISM bands 36 and/or one or more frequencies in another non-licensed frequency band(s) 38. The communication via the control channel 34 may use one or more standardized protocols 40, 44 and/or one or more proprietary protocols 42, 46. For example, the standardized protocols 40, 44 may include Bluetooth (2400 MHz), HIPERLAN (5800 MHz), IEEE 802.11 (2400 MHz and 5800MHz), and IEEE 802.15.4 (personal area networks using 915 MHz or 2400 MHz). The ISM bands 36 include:

| Frequency range | Center frequency |
| --- | --- |
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

Each of the WP power transceivers 20, 24, 30 (e.g., in the WP TX unit 10 and in each of the devices 12-14) includes baseband processing (which may be done by the corresponding processing module 18, 26, 32), a radio frequency (RF) and/or a millimeter wave (MMW) transmitter section, and an RF and/or MMW receiver section. In an example of operation, the baseband processing converts outbound data into outbound symbol stream in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The transmitter section converts the outbound symbol stream into an outbound RF signal that has a carrier frequency within a given frequency band (e.g., ISM bands 36). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal, which is transmitted as the outbound RF signal. In another embodiment, the outbound symbol stream includes amplitude information (e.g., A(t) [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., +/−ΔA [amplitude shift] and/or A(t) [amplitude modulation]) that adjusts the amplitude of the oscillation to produce the outbound RF signal.

The receiver section receives and amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The baseband processing converts the inbound symbol stream into inbound data (e.g. control channel data) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), proprietary protocol, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The WP TX unit 10 communicates with the devices 12-14 via the control channel to facilitate efficient wireless power transfer from the WP TX unit 10 to the power RX circuit 22, 28 of the devices 12-14. For example, the communication may be to determine which frequency to use, to reposition the device 12-14 to improve magnetic coupling, to tune the components of the power TX circuit 16 and/or the power RX circuit 22, 28, to indicate desired power levels, to adjust power levels, etc. As such, during the wireless transfer of energy from the power TX circuit 16 to the power RX circuit 22, 28 of one or more devices 12-14, the WP TX unit 10 and the devices 12-14 communicate to provide a desired performance level of wireless energy transfer.

In another example of operation, the receive unit processing module 26, 32 functions to identify the control channel protocol used by the wireless power transmit unit 10 for control channel communications. Note that the control channel includes one of a plurality of control channel protocols that includes at least one or more standard control channel protocols and/or one or more proprietary control channel protocols. Further note that the transmit unit transceiver 20 uses one of the control channel protocols and is capable of using a subset of the plurality of control channel protocols. For instance, one transmit unit transceiver 20 may use a Bluetooth protocol or a proprietary protocol for its control channel protocol, while another transmit unit transceiver 20 of another wireless power transmit unit 10 may use a different control channel protocol. As such, the receive unit needs to identify the control channel protocol.

The receive unit processing module 26, 32 may identify the control channel protocol by interpreting a beacon signal transmitted by the transmit unit transceiver to determine the control channel protocol. Alternatively, or in addition to the preceding example, the receive unit processing module 26, 32 may identify the control channel protocol by receiving a set-up communication from the transmit unit transceiver 20 using a default control channel protocol. As another alternative, or in addition to one or more of the preceding examples, the receive unit processing module 26, 32 may identify the control channel protocol by scanning a frequency spectrum for control channel activity to produce scanned frequency spectrum and identify the control channel protocol from the scanned frequency spectrum. As yet another alternative, or in addition to one or more of the preceding examples, the receive unit processing module 26, 32 may identify the control channel protocol by evoking a trial and error system using known control channel protocols.

When the receive unit processing module 26, 32 identifies the control channel protocol, it determines whether the receive unit transceiver is capable of communication using the control channel protocol. For example, the processing module is determining whether the receive unit transceiver 24, 30 be configured to support the control channel protocol. When the receive unit transceiver 24, 30 is capable of communication using the control channel protocol, the processing module coordinates configuration of the receive unit transceiver to transceive the communication regarding the wireless power magnetic field via the control channel. Configuring of the receive unit transceiver 24, 30 is discussed in greater detail with reference to FIG. 6.

As yet another alternative to identifying the control channel protocol, the transmit unit transceiver 20 and the receive unit transceiver 24, 30 may negotiate which control channel protocol to use. For example, the transmit unit transceiver may transceive negotiation information (e.g., what protocols they each support, desired data rate, available bandwidth, etc.) with the receive unit transceiver to mutually select the control channel protocol.

If the processing module 26, 32 cannot identify the control channel or the receive unit transceiver 24, 30 is not capable of being configured to use the control channel protocol, the processing module determines whether the receive unit transceiver is lacking hardware or lacking software to support the control channel protocol. When the receive unit transceiver is lacking software, the processing module generates a network message to download the software to support the control channel protocol. Once the software is downloaded, the receive unit transceiver 24, 30 is configured to support the control channel protocol.

With the control channel established between the wireless power transmit unit 10 and the device 12, 14, the wireless power transmit circuit 16 generates a wireless power magnetic field in accordance with the control channel data (e.g., power level, frequency, tuning, etc.). The wireless power receive circuit 22, 28 converts the wireless power magnetic field into a voltage, which may be used to charge a battery of the device and/or to power at least a portion of the device 12, 14.

Figure 2:
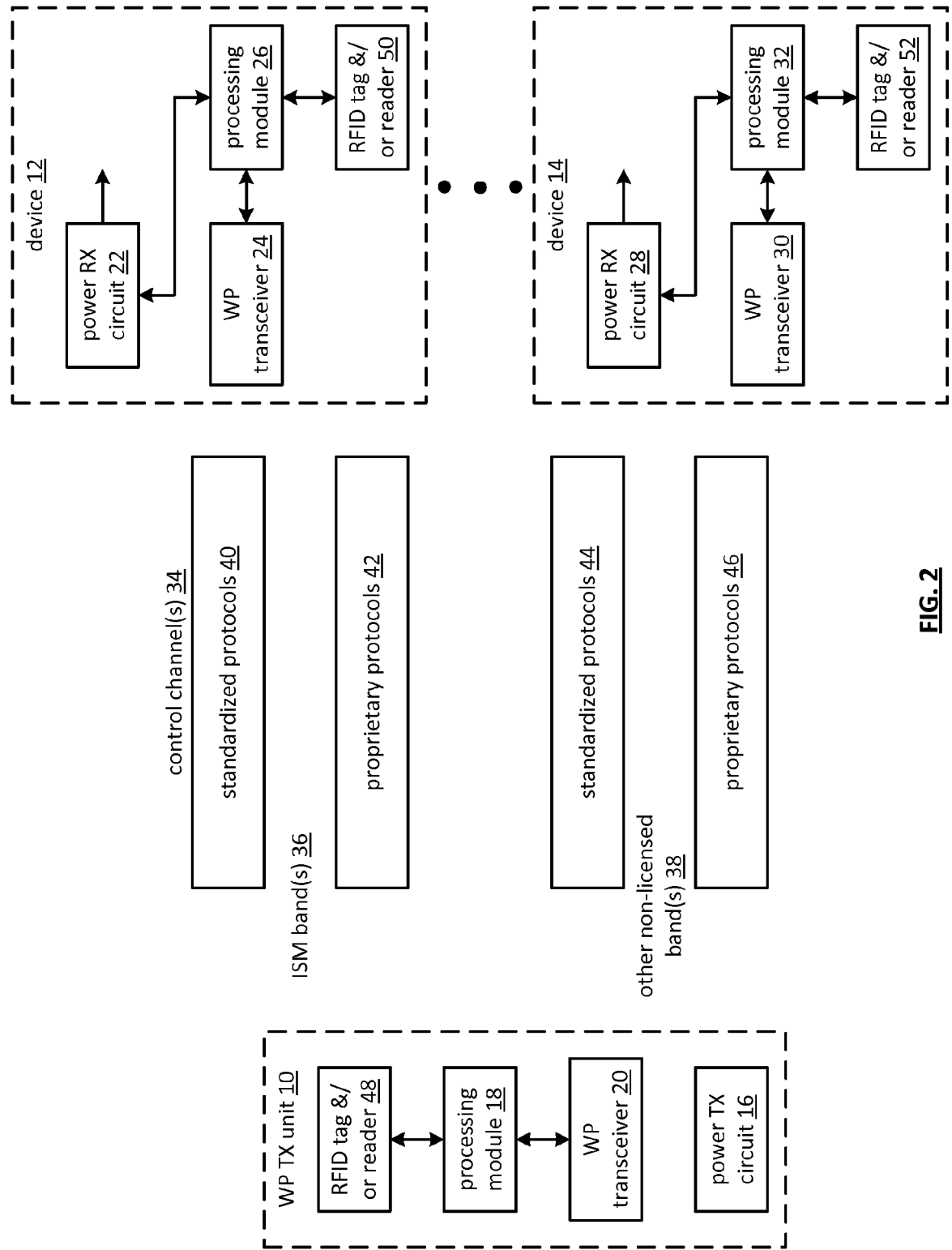
FIG. 2 is a schematic block diagram of another embodiment of a wireless power system in accordance with the present invention.

FIG. 2 is a schematic block diagram of another embodiment of a wireless power system that includes a wireless power (WP) transmit (TX) unit 10 and one or more devices. The WP TX unit 10 includes a processing module 18, a WP transceiver 20, an RFID (radio frequency identification) tag and/or reader 48, and a power TX circuit 16. Each device 12-14 includes a WP receive (RX) circuit 24, 28, a processing module 26, 32, an RFID tag and/or reader 50, 52, and a WP transceiver 24, 30. The device 12-14 will most likely include a plurality of other components depending on its desired functionality. For example, the device may be a cell phone, a personal audio/video player, a video game unit, a toy, etc. and it includes the corresponding circuitry.

In this embodiment, the RFID tags 48, 50, 52 include information regarding the wireless power requirements and capabilities of the devices 12-14 and of the WP TX unit 10. For instance, the information may include the communication protocol to use (e.g., one or more of the standardized protocols 40, 44 or one or more of the proprietary protocols 42, 46), the wireless power frequency spectrum, impedance matching information, battery charging requirements, etc. The RFID readers and tags 48, 50, 52 may be active or passive devices and may use backscattering to communicate. As such, the devices 12-14 initially communicate with the WP TX unit 10 to exchange set up information and, once set up, the devices 12-14 communicate with the WP TX unit 10 via the WP transceivers 20, 24, 30.

Figure 3:
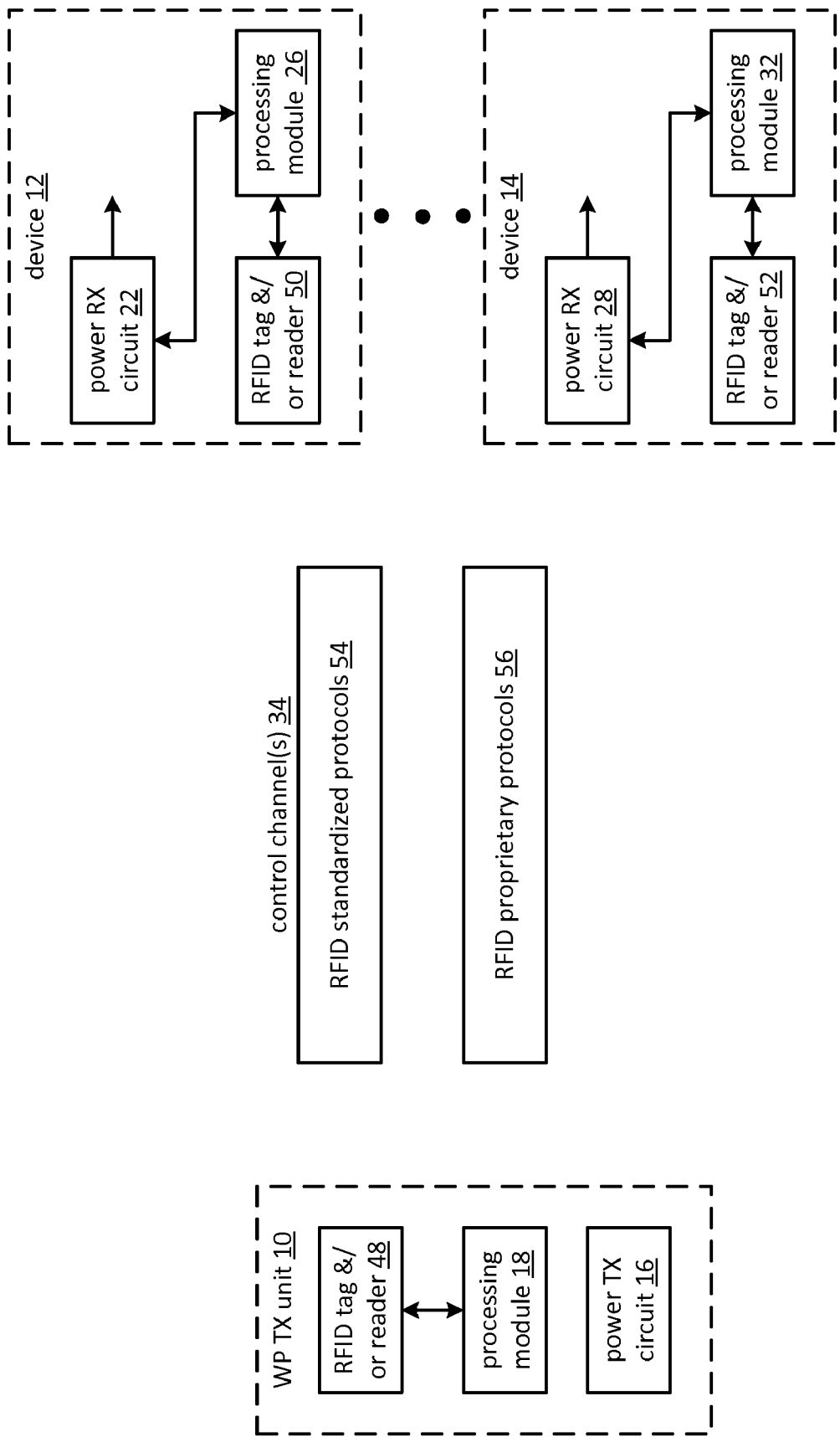
FIG. 3 is a schematic block diagram of another embodiment of a wireless power system in accordance with the present invention.

FIG. 3 is a schematic block diagram of another embodiment of a wireless power system that includes a wireless power (WP) transmit (TX) unit 10 and one or more devices 12-14. The WP TX unit 10 includes a processing module 18, an RFID (radio frequency identification) tag and/or reader 48, and a power TX circuit 16. Each device 12-14 includes a WP receive (RX) circuit 22, 28, a processing module 26, 32, and an RFID tag and/or reader 50, 52. The device 12-14 will most likely include a plurality of other components depending on its desired functionality. For example, the device may be a cell phone, a personal audio/video player, a video game unit, a toy, etc. and it includes the corresponding circuitry.

In this embodiment, the RFID tags 48, 50, 52 include information regarding the wireless power requirements and capabilities of the devices 12-14 and of the WP TX unit 10. For instance, the information may include the communication protocol to use (e.g., one or more of the standardized protocols 54 or one or more of the proprietary protocols 56), the wireless power frequency spectrum, impedance matching information, battery charging requirements, etc. In addition to exchanging set up information, the WP TX unit 10 and the devices 12-14 use the RFID tags and readers 48, 50, 52 as the primary communication means between them. Note that the RFID readers and tags 48, 50, 52 may be active or passive devices and may use backscattering to communicate.

Figure 4:
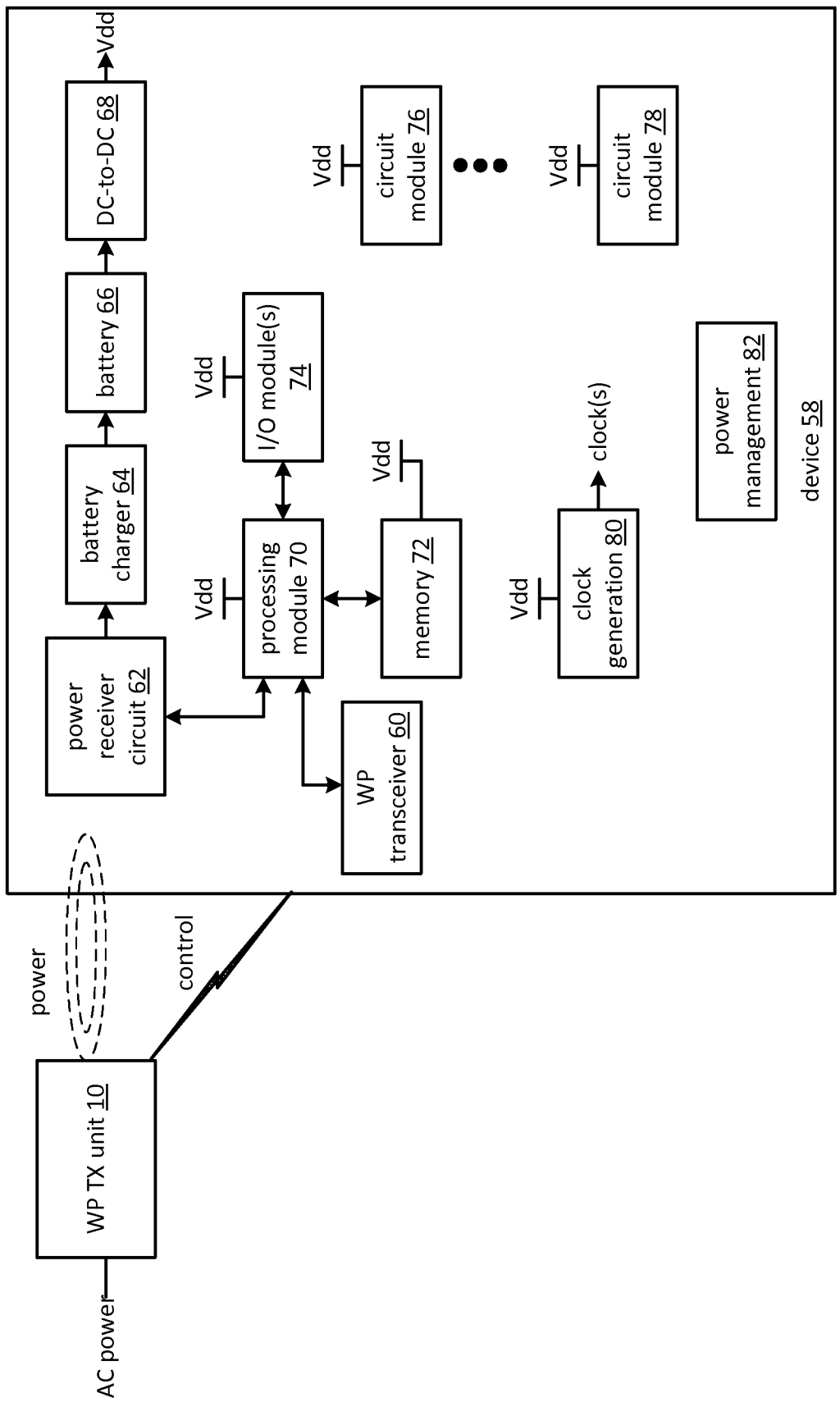
FIG. 4 is a schematic block diagram of another embodiment of a wireless power system in accordance with the present invention.

FIG. 4 is a schematic block diagram of another embodiment of a wireless power system that includes the WP TX unit 10 and a device 58. The device 58 includes the power receiver circuit 62, a battery charger 64, a battery 66, a DC-to-DC converter 68, the processing module 70, memory 72, a plurality of input/output (I/O) modules 74, a plurality of circuit modules 76-78, a clock generation unit 80, and a power management unit 82. Note that the device 58 may be one of the devices 12-14 of FIGS. 1-3.

In an example of operation, after the WP TX unit 10 and the device 58 have established communication, the WP TX unit 10 generates a magnetic field that is received by the power receiver circuit 62, which is integrated into device 58. This will be discussed in greater detail with reference to one or more of the subsequent figures. The power receiver circuit 62 generates an AC voltage from the magnetic field, rectifies the AC voltage to produce a rectified voltage, and filters to the rectified voltage to produce a DC voltage rail (e.g., V+ and V−). The power receiver circuit 62 may be tuned based on control signals provided by the processing module 70. The tuning includes adjusting one or more electromagnetic properties, such as the quality factor of the circuit, adjusting impedance, current limiting, etc., of the magnetic field and/or the wireless power receiver circuit 62.

The battery charger 64 converts the DC voltage rail into a battery charge voltage, which it provides to the battery 66. The battery charger 64 monitors the charging to insure proper charging in accordance with the type of battery and, once the battery 66 is charged, may implement a trickle charge. Note that the processing module 70 may provide control signals to the battery charger 64 to regulate the charging in accordance with the type of battery.

The DC-to-DC converter 68 converts the battery voltage (e.g., 1.5 volts, 4.2 volts, etc.) into one or more supply voltages (e.g., 1 volt, 2.2 volts, 3.3 volts, 5 volts, 12 volts, etc.). The DC-to-DC converter 68 provides the supply voltages to one or more of the other modules 70, 72, 74, 76, 78, 80 under the direction of the power management module 82. In general, the power management module 82 functions to control power consumption by the device 58 to an optimal level (e.g., balancing of performance and battery life). In this regard, the power management module 82 may treat each module 70, 72, 74, 76, 78, 80 as a separate power island that can be individually controlled. For example, when a circuit module 76-78 is inactive, the power management module 82 may remove power from the circuit module 76-78. As another example, the power management module 82 may reduce the voltage provided to a circuit module 76-78 when the circuit module 76-78 does not need to operate at its maximum potential.

In addition to controlling the supply voltage to each power island, the power management module 82 may control the clock signals provided to each circuit module 76-78 that uses a clock signal. For example, when a circuit is idle, the power management module 82 may provide a reduced supply voltage to the circuit module 76-78, but disable the clock signal provided to the circuit module 76-78. In this way, minimal power is consumed, but the circuit module 76-78 may be quickly activated when it is needed. As another example, the power management module 82 may reduce the frequency of a clock signal for a circuit module 76-78 when the circuit module 76-78 does not need to operate at its maximum potential.

The plurality of circuit modules 76-78 provides at least some of the functionality for the device 58. For example, if the device is a cell phone, the circuit modules 76-78 may provide a digital image capture function, a digital image display function, an audio file playback function, a data messaging function, a voice call function, etc. The plurality of input/output (I/O) modules 74 provides the interface to the user input/ output components (e.g., speaker, microphone, display, buttons, etc.) of the device 58. For example, a circuit module may generate outbound data (e.g., a captured digital image). The processing module processes the outbound data to produce processed data (e.g., generates a digital image file) and provides the processed outbound data to an input/output module for display on a peripheral output component (e.g., an LCD display). As another example, an input/output module may receive inbound data (e.g., a place call command) from a peripheral input component (e.g., keypad of the device) and provide it to the processing module. The processing module processes the inbound data to produce processed inbound data (e.g., retrieve the phone number of the target identified in the call command). The processing module provides the processed inbound data to a circuit module, which performs a function on the processed inbound data (e.g., places the call to the target).

Figure 5:
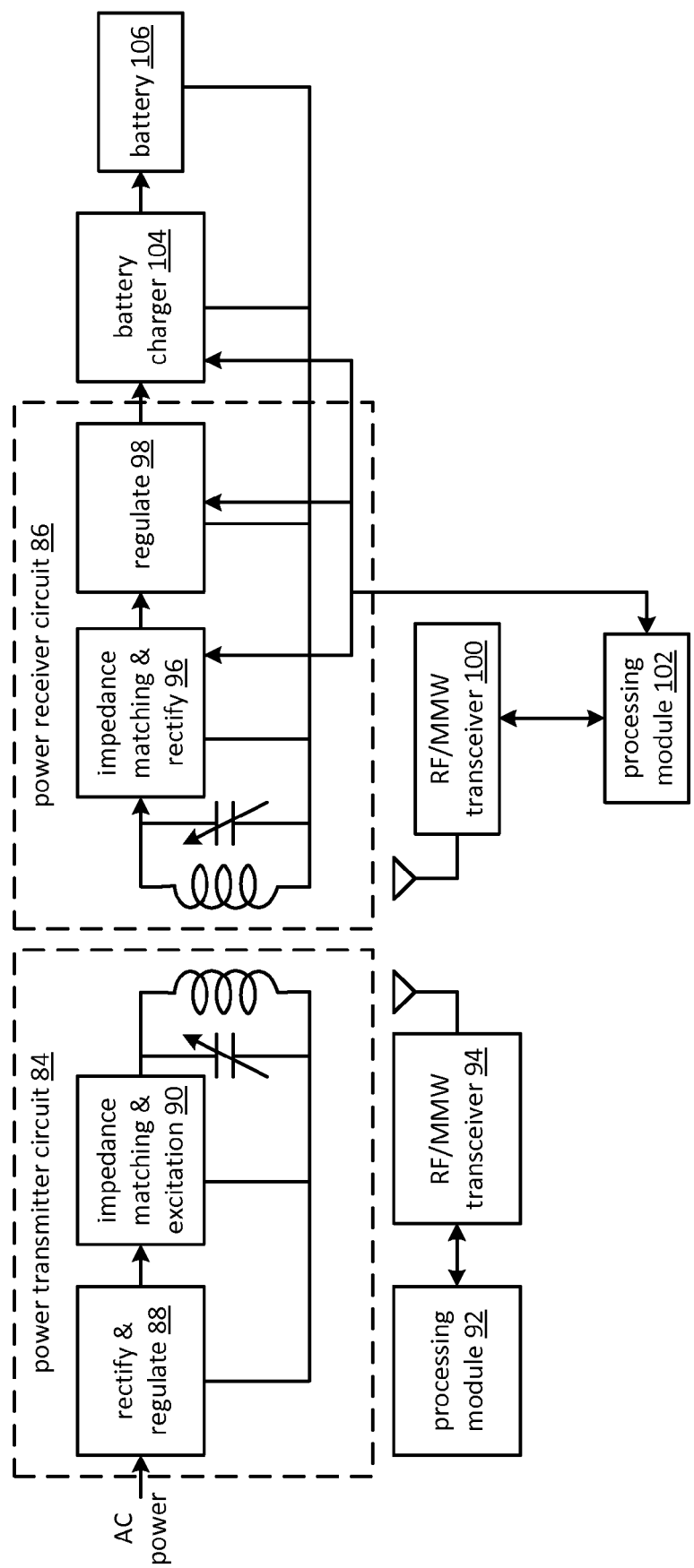
FIG. 5 is a schematic block diagram of another embodiment of a wireless power system in accordance with the present invention.

FIG. 5 is a schematic block diagram of an embodiment of a portion of a wireless power system that includes the power transmitter circuit 84 and the power receiver circuit 86. The power transmitter circuit 84 includes a coil (i.e., an inductor), a rectify and regulate circuit 88, an impedance matching and excitation circuit 90, a processing module 92, and an RF and/or MMW transceiver 94. The power receiver circuit 86 includes a coil, an impedance matching and rectify circuit 96, a regulate circuit 98, and an RF and/or MMW transceiver 100. The power receiver circuit 86 is coupled to the battery charger 104 and the processing module 102. In this regard, the power receiver circuit 84 is readily integrated into the device and uses components of the device (e.g., the processing module 102). As such, the power receiver circuit 86 is not a standalone component coupled to the device, but an integral part of the device. Note that the device 12,14, 58 will typically include a housing, which houses the power receiver circuit 86, the battery charger 104, the battery 106, and the RF/MMW transceiver 100, the processing module 102, and the components as shown in FIG. 4.

In an example of operation, the rectify and regulate circuit of the power transceiver circuit 84 converts an AC voltage (e.g., 110 VAC, 220 VAC, etc.) into a DC voltage (e.g., 160 VDC, 320 VDC, etc.). The impedance matching and excitation circuit 90 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power RX 86 unit is proximal to the coil of the TX unit 84 to receive the magnetic field created by the TX coil and to create an AC voltage therefrom. The LC circuit of the RX coil and capacitor may be tuned to have a desired resonance and/or a desired quality factor. The impedance matching and rectify circuit 96 rectifies the AC voltage of the RX coil to produce a DC rail voltage that is regulated via the regulation circuit. The remainder of the diagram functions as previously discussed and/or as will be subsequently discussed.

Figure 6:
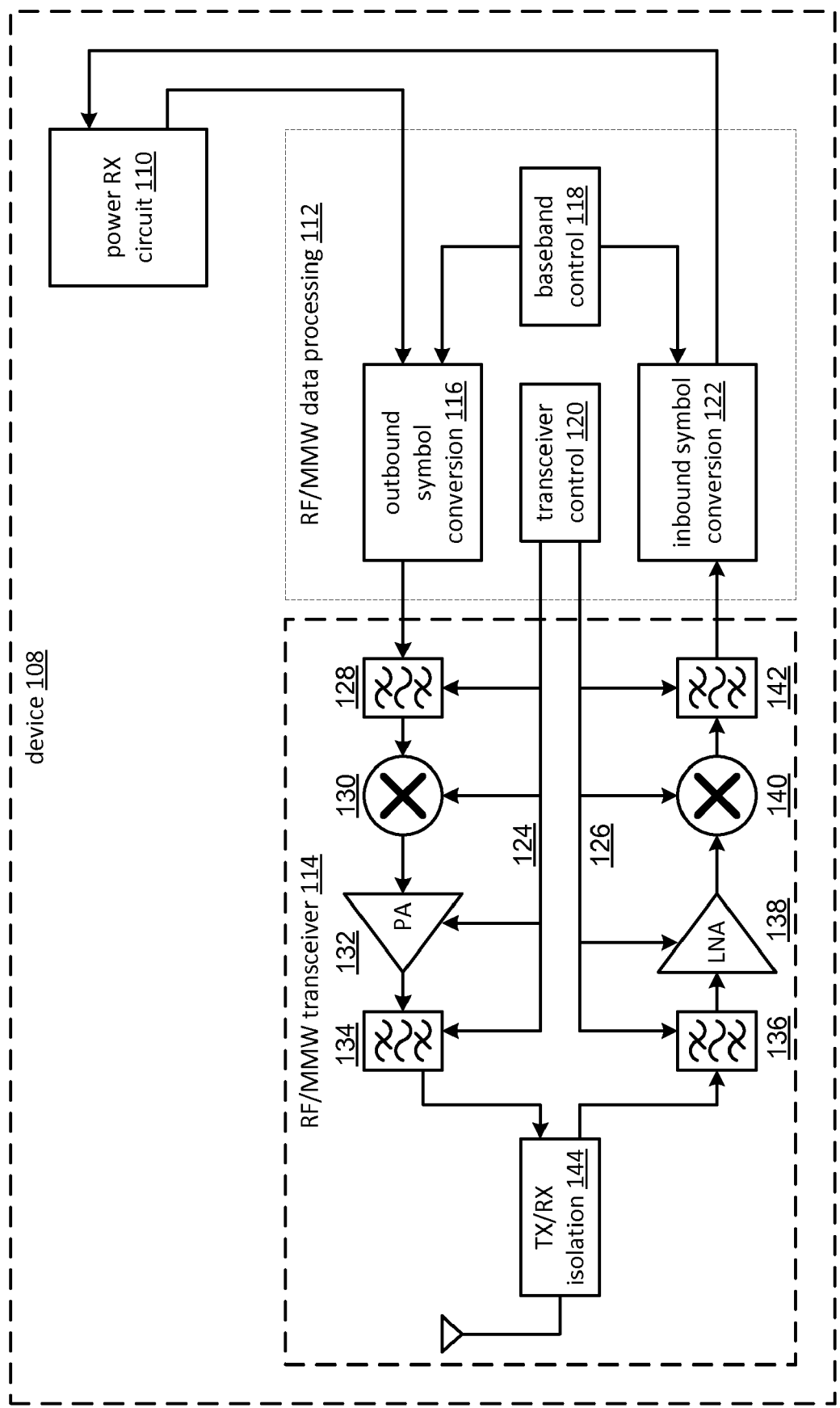
FIG. 6 is a schematic block diagram of an embodiment of a wirelessly powered device in accordance with the present invention.

FIG. 6 is a schematic block diagram of an embodiment of a wirelessly powered device 108 that includes the power RX circuit 110, an RF and/or MMW data processing module 112 (which may be implemented within the processing module) and the RF and/or MMW transceiver 114. The RF and/or MMW data processing module 112 includes an outbound symbol conversion module 116, a baseband control module 118, a transceiver control module 120, and an inbound symbol conversion module 122. The RF and/or MMW transceiver 114 includes a transmitter 124 and a receiver 126. The transmitter 124 includes a low IF (e.g., 0 to a few MHz) bandpass filter 128, a mixing module 130, a power amplifier (PA) 132, and an RF bandpass filter 134. The receiver 126 includes an RF bandpass filter 136, a low noise amplifier (LNA) 138, a mixing module 140, and a low IF bandpass filter 142. If the transmitter 124 and receiver 126 share an antenna, the transceiver 114 further includes a TX/RX isolation circuit 144 (e.g., a circulator, a transformer balun, a TX/RX switch, etc.).

In an example of operation, the data processing module 112 configures itself based on the communication protocol being implemented and the corresponding data modulation. In addition, the transceiver control module provides control signals to the transceiver 114 to adjust one or more of the components thereof based on the protocol being implemented. In this regard, the data processing module 112 and the transceiver 114 may be configured to implement one or more of the standard communication protocols and/or one or more of the proprietary communication protocols. Note that the device 108 may include one or more configurable RF/MMW data processing modules 112 and/or one or more configurable RF/MMW transceivers 114.

Figure 7:
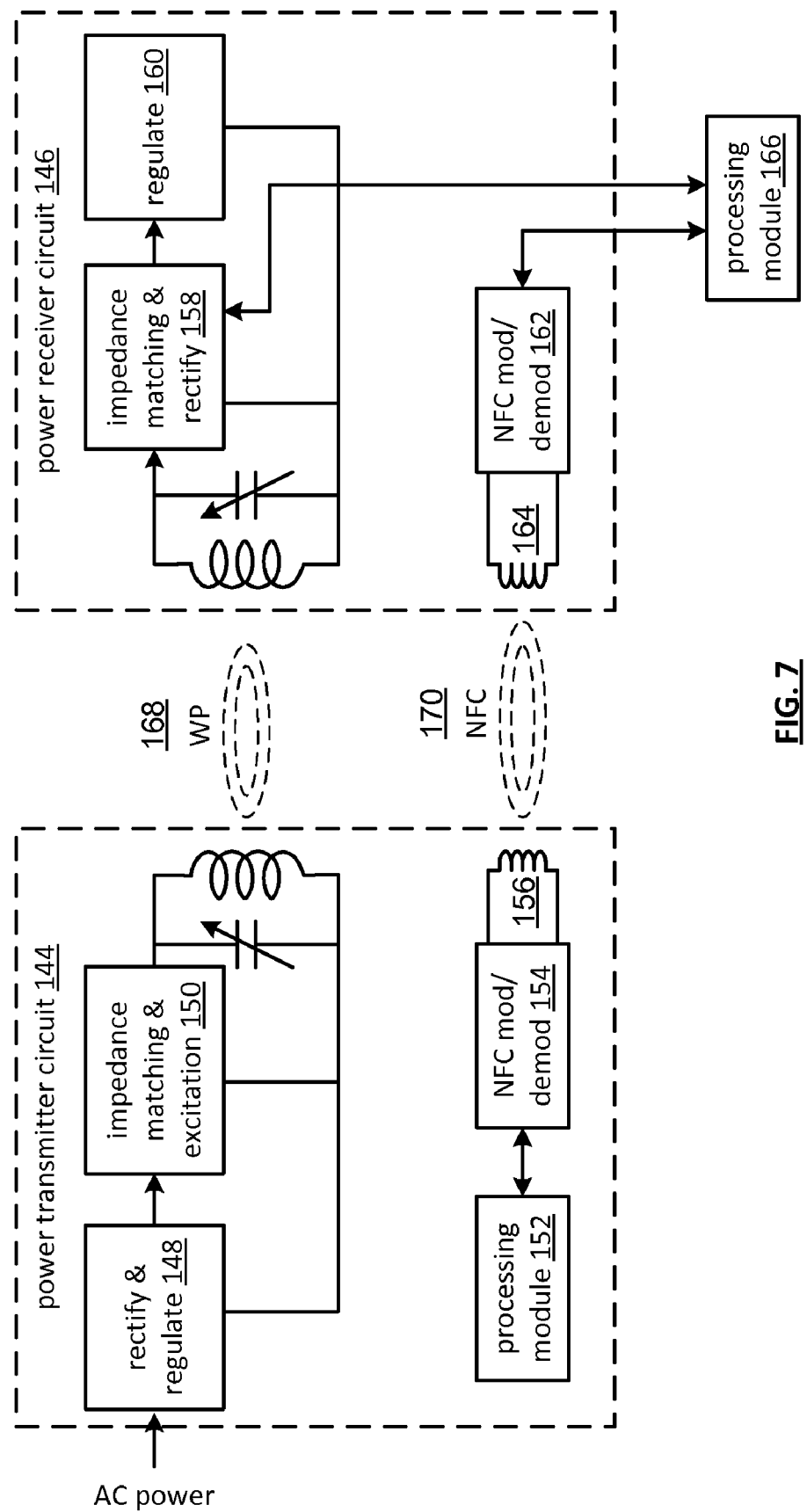
FIG. 7 is a schematic block diagram of an embodiment of a portion of a wireless power system in accordance with the present invention.

FIG. 7 is a schematic block diagram of an embodiment of a portion of a wireless power system that includes the power transmitter circuit 144 and the power receiver circuit 146. The power transmitter circuit 144 includes a rectify and regulate circuit 148, an impedance matching and excitation circuit 150, a processing module 152, an NFC modulator/demodulator 154, and an NFC coil 156. The power receiver circuit 146 includes an impedance matching and rectify circuit 158, a regulate circuit 160, an NFC modulator/demodulator 162, and an NFC coil 164. The power receiver circuit 146 is coupled to the battery charger (not shown in figure) and the processing module 166.

In an example of operation, the rectify and regulate circuit 148 of the power transmitter circuit 144 converts an AC voltage (e.g., 110 VAC, 220 VAC, etc.) into a DC voltage (e.g., 160 VDC, 320 VDC, etc.). The impedance matching and excitation circuit 150 couple the TX power coil to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil of the power receiver circuit 146 is proximal to the coil of the transmitter circuit 144 to receive the magnetic field created by the TX coil and to create an AC voltage therefrom. The LC circuit of the RX coil and capacitor may be tuned to have a desired resonance and/or a desired quality factor. The impedance matching and rectify circuit 158 rectifies the AC voltage of the RX coil to produce a DC rail voltage that is regulated via the regulation circuit 160.

The device communicates to the power transmitter circuit 144 via NFC (near field communication) 170. For example, when the device has data to convey to the power transmitter circuit 144, the processing module 166 generates the data, which it provides to the NFC modulator/demodulator 162. The NFC mod/demodulator 162 modulates the data at a given frequency (e.g., 13 MHz, 900 MHz, etc.) that drives the NFC coil 164. The NFC coil 164 creates a magnetic field that is received by the NFC coil 156 of the power transmitter circuit 144. The NFC mod/demod unit 154 demodulates the signal produced by the NFC coil 156 to recover the transmitted data, which is provided to the processing module 152. Data from the power transmitter circuit 144 to the device is processed in a similar manner.

Figure 8:
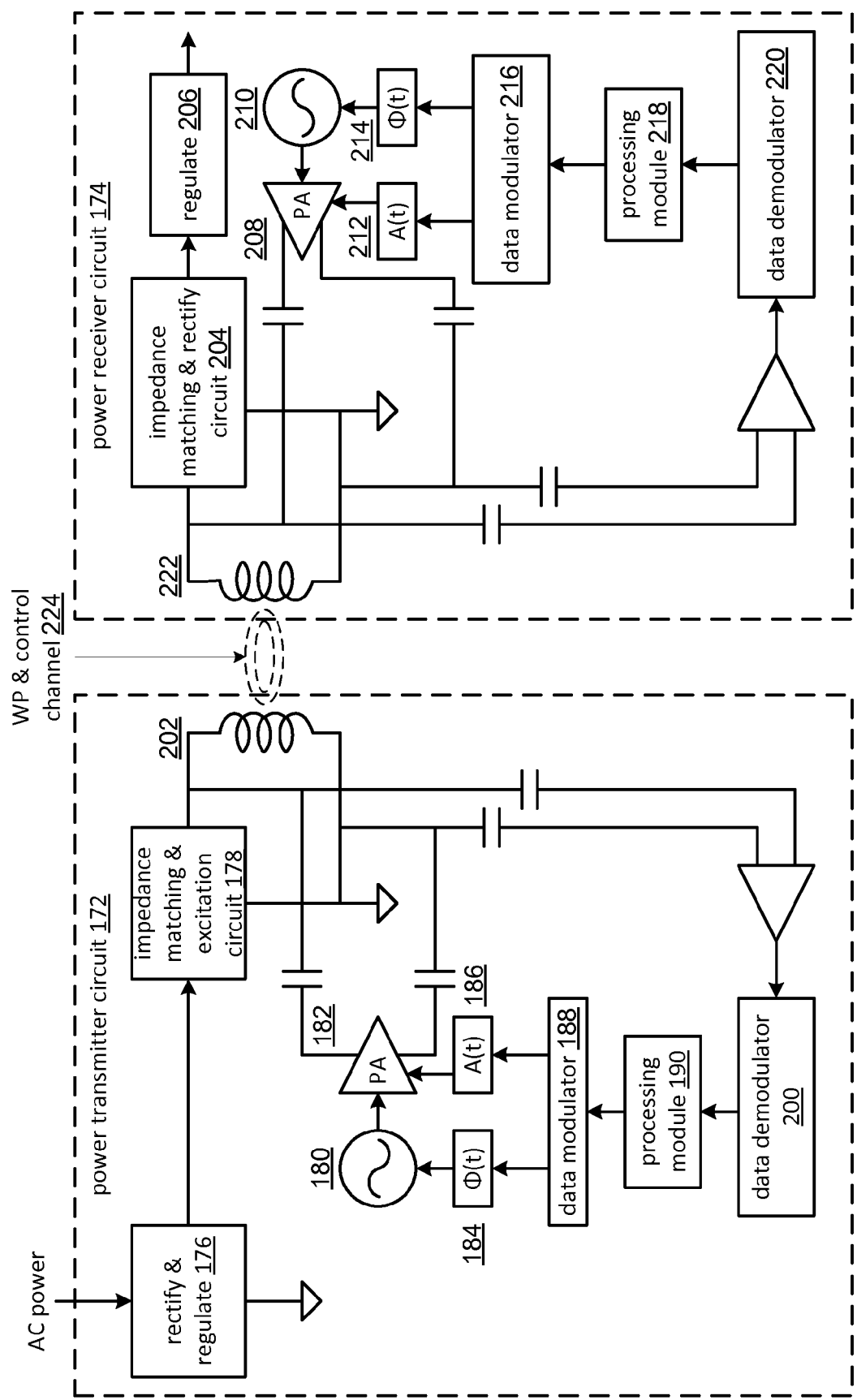
FIG. 8 is a schematic block diagram of another embodiment of a portion of a wireless power system in accordance with the present invention.

FIG. 8 is a schematic block diagram of another embodiment of a portion of a wireless power system that includes the power transmitter circuit 172 and the power receiver circuit 174. The power transmitter circuit 172 includes a rectify and regulate circuit 176, an impedance matching and excitation circuit 178, a processing module 190, an NFC modulator/demodulator 188, 200, and a share WP & NFC coil 202. The power receiver circuit 174 includes an impedance matching and rectify circuit 204, a regulate circuit 206, an NFC modulator/demodulator 216, 220, and an NFC coil 222. The power receiver circuit 174 is coupled to the battery charger (not shown in figure) and the processing module 218.

In an example of operation, the rectify and regulate circuit 176 of the power transmitter circuit 172 converts an AC voltage (e.g., 110 VAC, 220 VAC, etc.) into a DC voltage (e.g., 160 VDC, 320 VDC, etc.). The impedance matching and excitation circuit 178 couple the TX power coil 202 to the DC voltage in an alternating pattern (e.g., a full bridge inverter, a half bridge inverter) at a given frequency (e.g., 10 MHz, etc.). The impedance matching allows the LC circuit of the capacitor and coil to be tuned to a desired resonant frequency and to have a desired quality factor. For example, the LC circuit may be tuned to resonant at the excitation rate.

The coil 202 of the power receiver circuit 174 is proximal to the coil 222 of the power transmitter circuit 172 to receive the magnetic field created by the TX coil 202 and to create an AC voltage therefrom. The LC circuit of the RX coil 222 and capacitor may be tuned to have a desired resonance and/or a desired quality factor. The impedance matching and rectify circuit 204 rectifies the AC voltage of the RX coil 222 to produce a DC rail voltage that is regulated via the regulation circuit.

The device communicates with the WP TX unit via NFC (near field communication) using the shared WP & NFC coils 202, 222. For example, when the device has data to convey to the WP TX unit, the processing module 218 generates the data, which it provides the NFC data modulator 216. The NFC modulator 216 modulates the data at a given frequency (e.g., 13 MHz, 900 MHz, etc.) to produce an amplitude component (A(t)) 212 and a phase component ($\Phi$(t)) 214. The phase component 214 adjusts the phase of an oscillation (cos $\omega$(t)) to produce a phase adjusted oscillation (cos($\omega$(t)+$\Phi$(t))) 210. The power amplifier 208 amplifies the phase adjusted oscillation 210 by the amplitude component 212 to produce an amplitude modulated and phase adjusted signal (A(t)cos ($\omega$(t)+$\Phi$(t))). The signal is AC coupled to the shared WP & NFC coil 222 for conveyance to the WP TX unit.

The shared coil 202 of the WP TX unit receives the signal (e.g., $A_0$ cos($\omega_0$(t))*A(t)cos($\omega$(t)+$\Phi$(t)), where $A_0$ is the amplitude of the WP signal and $\omega_0$ corresponds to the frequency of the WP signal). The NFC signal component is AC coupled to the data demodulator 200 and the WP component is provided to the impedance matching circuit 178. The data demodulator 200 recovers the data from the amplitude component 186 and the phase component 184 and provides the data to the processing module 190.

Figure 9:
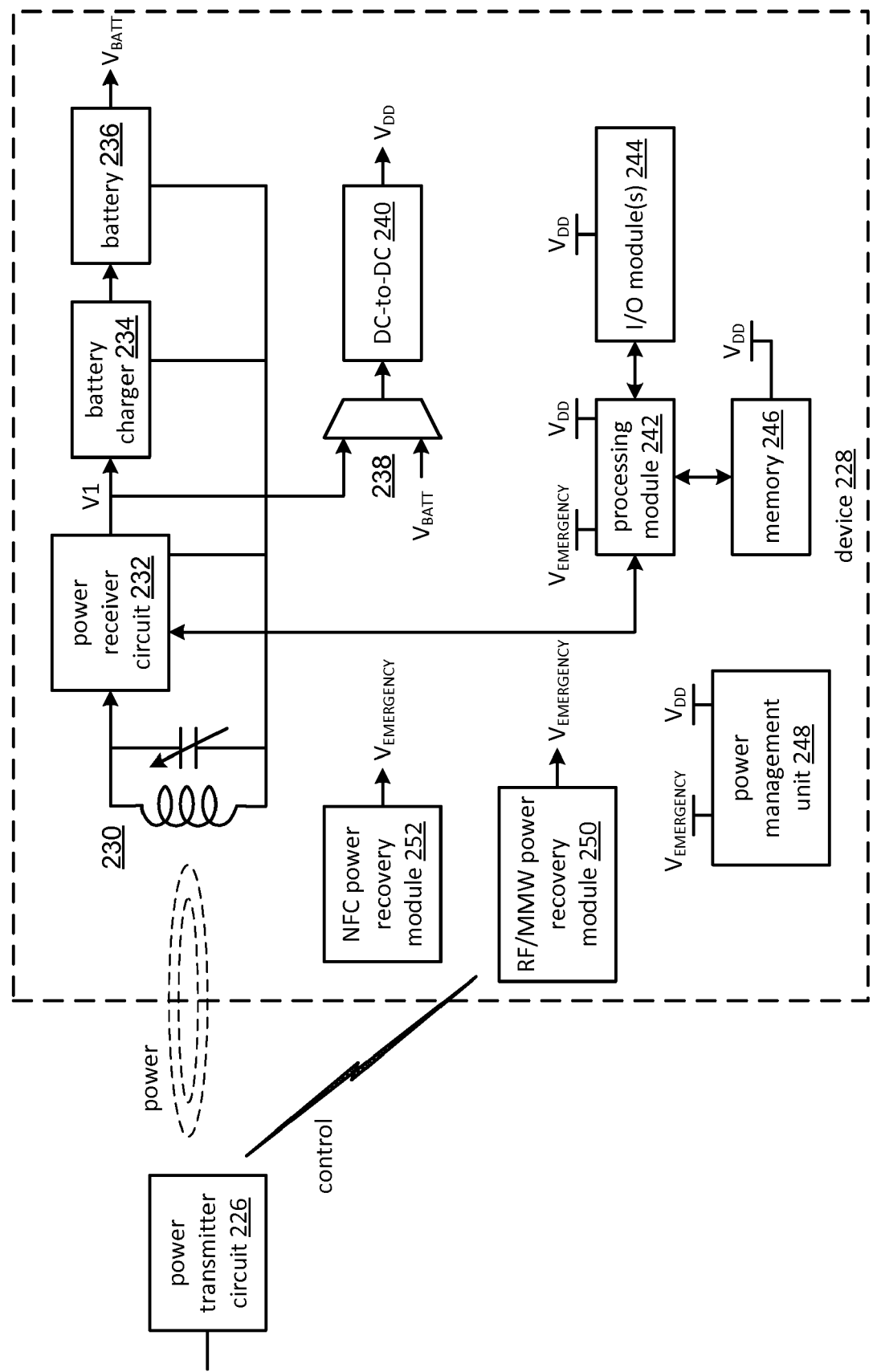
FIG. 9 is a schematic block diagram of another embodiment of a wireless power system in accordance with the present invention.

FIG. 9 is a schematic block diagram of another embodiment of a wireless power system that includes the WP TX unit 226 and a device 228. The device 228 includes the WP coil 230, the power RX circuit 232, the battery charger 234, the battery 236, a multiplexer 238 or the like, the DC-to-DC converter 240, the processing module 242, the IO interface modules 244, the memory 246, the power management unit 248, an NFC power recovery module 252, and/or an RF/MMW power recovery module 250.

In an example of operation, when the battery 236 is dead or near dead and as insufficient power to power minimal circuitry to facilitate battery charging, the NFC power recovery module 252 and/or RF/MMW power recovery module 250 generate an emergency voltage to provide the energy to initiate battery charging. Once energy is being received from the WP TX unit 226, the emergency supply generators may be disabled and the supply voltage V1 may be used to power the device 228 during charging and/or after charging is complete (i.e., in a trickle charge mode). Note that as long as WP energy is being received, the device 228 may be powered by V1 or another voltage derived from the WP energy.

Figure 10:
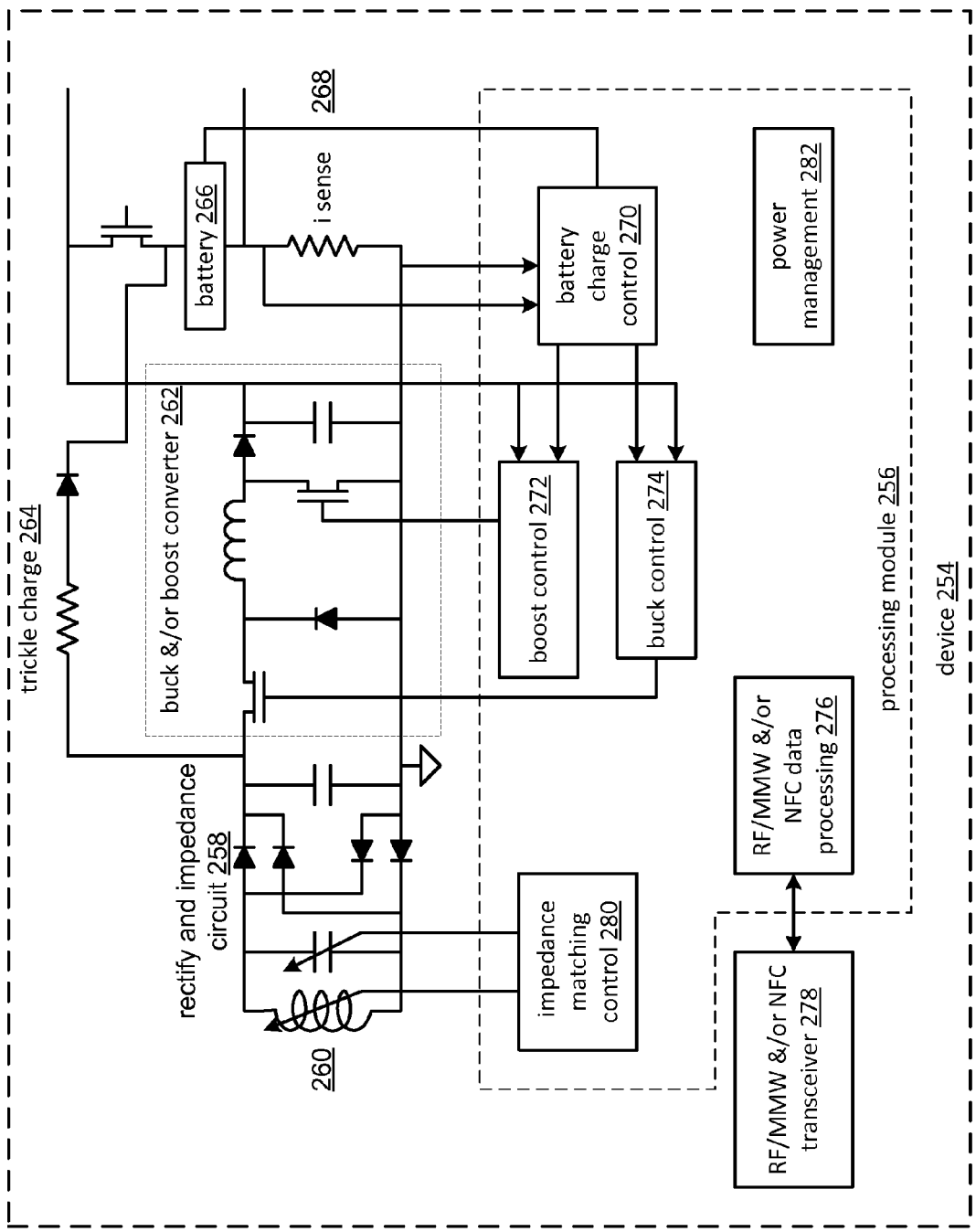
FIG. 10 is a schematic block diagram of another embodiment of a wirelessly powered device in accordance with the present invention.

FIG. 10 is a schematic block diagram of another embodiment of a wirelessly powered device 254 that includes the processing module 256, the rectify and impedance matching circuit (e.g., capacitors and diodes) 258, the RX coil 260, a buck &/or boost converter 262, a trickle charge circuit 264, a battery 266, and a battery current sensor 268. The processing module 256 implements a battery charger controller 270, a boost controller 272, a buck controller 274, an impedance matching control 280, and an RF/MMW and/or NFC data processing module 276. The processing module 256 may further implement the power management unit 282. Note that the processing module 256 may be fabricated on a single integrated circuit or on a multiple integrated circuit with one or more of the components of the converter 262, the rectifier circuit 258, the trickle charge circuit 264, and/or the battery current sense 268.

In an example of operation, the RX coil 260 (which may include one or more adjustable inductors) receives a magnetic field from the WP TX unit and creates an AC voltage therefrom. The adjustable capacitor is tuned (alone in conjunction with the RX coil 260) to a desired resonance, impedance, and/or quality factor to facilitate the creation of the AC voltage. The full bridge rectifier (e.g., the diodes) rectify the AC voltage to produce a rectified voltage that is filtered by the capacitor to produce a DC rail voltage (e.g., 3-20 volts).

The buck and/or boost converter 262 is enabled in a buck converter mode when the DC voltage rail is to be stepped down to produce battery charge voltage (and the supply voltage Vdd for the device) and is enabled in boost converter mode when the DC rail voltage is to be stepped up to produce the battery charge voltage (and the supply voltage Vdd). Note that when the buck and/or boost converter 262 is in the boost mode, the buck transistor is enabled. Further note that the buck and/or boost converter 262 may include multiple inductors, transistors, diodes, and capacitors to produce multiple supply voltages.

When the battery 266 is charging, the battery charge control module 270 monitors the battery current and voltage to insure charging is in accordance with the charging requirements of the battery 266. When the battery 266 is charged, the battery 266 is disconnected from the converter 262 (which may be disabled or enabled to provide Vdd) and the battery 266 may be trickle charged. Note that when the WP is lost, the battery 266 is coupled to provide the power for the device 254.

Figure 11:
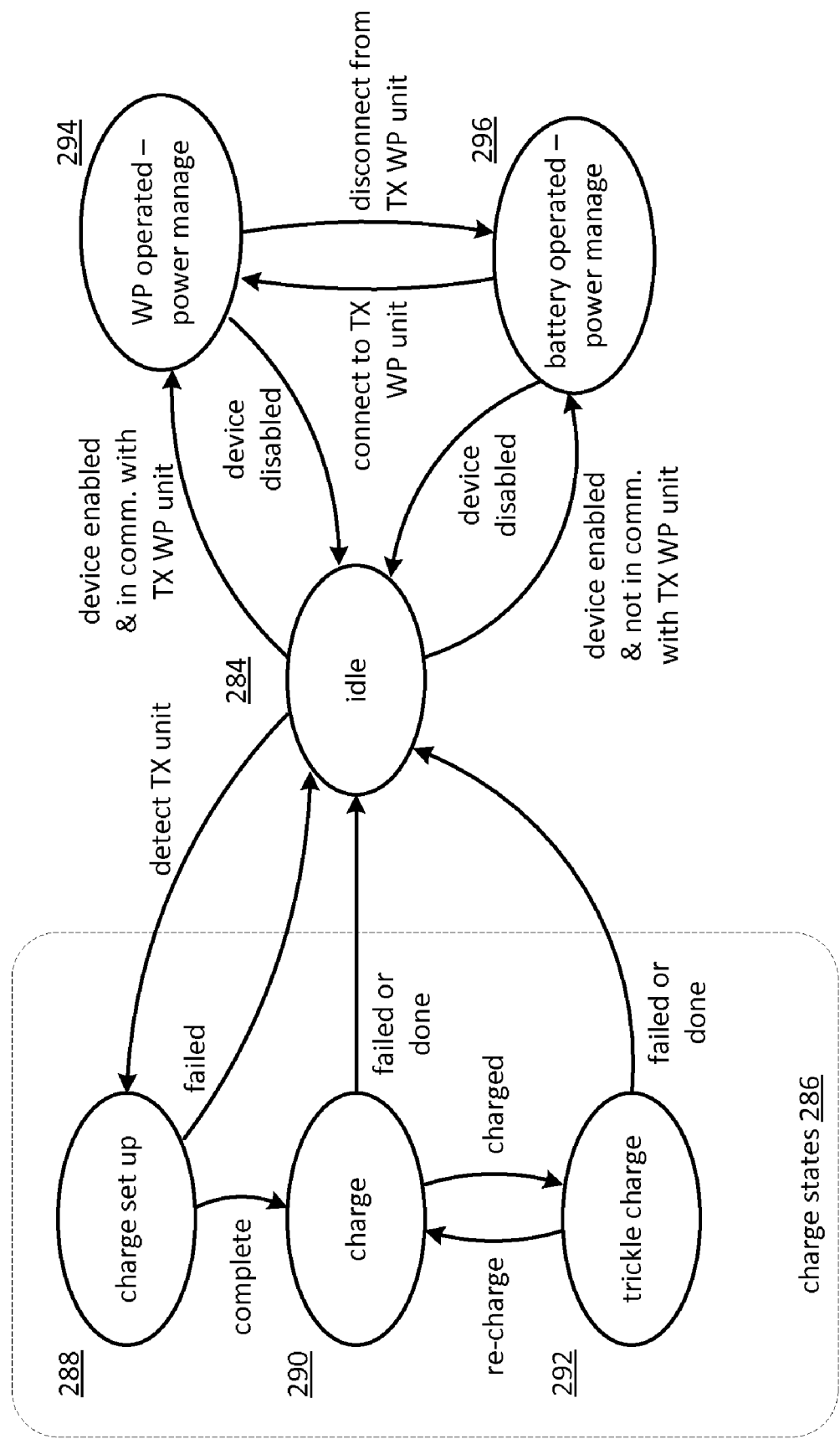
FIG. 11 is an example state diagram of a processing module of a wirelessly powered device in accordance with the present invention.

FIG. 11 is an example state diagram of a processing module of a wirelessly powered device 12-14, 58 that includes six states 286: idle 284, charge set up 288, charge 290, trickle charge 292, WP operated—power management 294, and battery operated—power management 296. The device starts in the idle state 284 and waits to detect the WP TX unit, WP operation enablement, or battery operation enablement. The device may be in one of the charge states 286 and the WP operated—power management state 294 concurrently.

When the device detects the WP TX unit (e.g., via RFID communication, via control channel communication, via sensing a magnetic field, etc.), the device transitions from the idle state 284 to the charge set up state 288. When in the charge set up state 288, the device functions as referenced in FIGS. 12 and/or 13, which will be subsequently discussed. The device transitions back to the idle state 284 if the set up failed, which may result from failing to establish a control channel communication, the WP TX unit not being able to currently service the device, circuit damage, a bad battery, or loss of connection.

The device transitions to the charge state 290 when the charge set up is complete. While in the charge state 290, the device functions as referenced in FIGS. 14 and/or 15, which will be subsequently discussed. The device transitions to the idle state 284 if the charging failed or the charging is complete and the battery does not require a trickle charge. If the charging is complete and the battery will be trickled charge, the device transitions to the trickle charge state 292. The device stays in this state until a failure occurs (e.g., loss of connection with the WP TX unit) or until the trickle charge is complete. In either event, the device transitions back to the idle state 284.

When the device is enabled for operation, the device transitions to the WP operated—power manage state 294 when the device is enabled and is connected to the WP TX unit. While in this state, the device functions as referenced in FIG. 16, which will be subsequently discussed. The device transitions back to the idle state 284 when the device is disabled (e.g., turned off, placed in a sleep mode, etc.). Note that while the device is in this state, it may also be in one of the charge states.

The device transitions from the WP operated state 294 to the battery operated—power manage state 296 when the device is disconnected from the WP TX unit. The device may also enter the battery-operated state 296 from the idle state 284 when the device is enabled and not connected to the WP TX unit. While in this state, the device functions as referenced in FIG. 17, which will be subsequently discussed. The device transitions back to the WP operated state 294 when the device is again connected to the WP TX unit. The device transitions back to the idle state 284 when the device is disabled (e.g., turned off, sleep mode, low battery, etc.).

In an embodiment, the device may include an integrated circuit (IC) that includes at least a portion of a wireless power receiver circuit 86 (e.g., an on-chip coil, an on-chip variable capacitor, components of the impedance matching & rectify circuit 96 (diodes of the rectify circuit may be off-chip), and components of the regulation circuit 98), a transceiver, and a processing module. The wireless power receiver circuit converts the electromagnetic signal into a voltage and the transceiver, when operable, transceives a control channel communication.

The processing module is operable to transition the device from an idle state to a charge state when a wireless power transmitter unit is detected. The processing module is further operable to transition the device from the idle state to a wireless power operated state when a wireless power transmit circuit is detected and the device is enabled. The processing module is still further operable to transition the device from the idle state to a battery operated state when the device is enabled and the wireless power transmit circuit is not detected.

Alternatively, or in addition to the above, the processing module may be operable to detect availability of the wireless power transmitter unit via the control channel communication. The processing module may then, when the wireless power transmitter unit is available, determine battery charging needs and whether the device is active. The processing module may then, when the battery charging needs compares unfavorably to a threshold, initiate battery charging using the voltage. The processing may, when the device is active, enable wireless power operation and, when the wireless power transmitter is not available, enable battery operated mode for the device.

Figure 12:
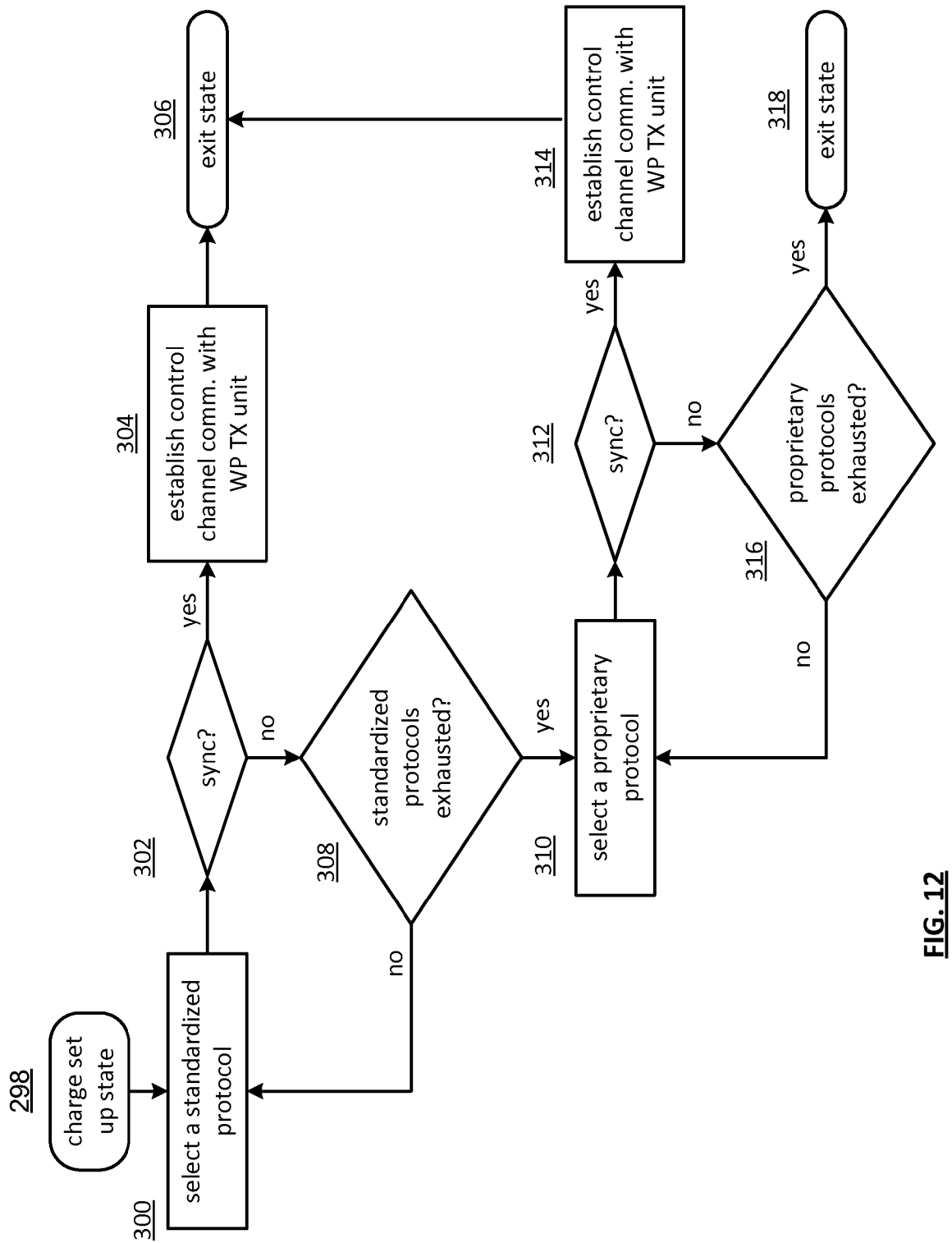
FIG. 12 is a logic diagram of an embodiment of a method for a charge set up state in accordance with the present invention.

FIG. 12 is a logic diagram of an embodiment of a method for a charge set up state 298 that begins with the device working with the WP TX unit to select a standardized communication protocol 300. Examples of the communication protocols were presented with reference to FIGS. 1-3. Note this step may begin by assuming a default communication protocol (e.g., RFID, Bluetooth, etc.) to initiate communication and then, once communication is established, selecting another communication protocol. The method continues with the device determining whether the device is synchronized via a control channel with the WP TX unit 302. In other words, is a usable control channel established between the device and the WP TX unit? If yes, the method continues with the device establishing a control channel communication with the WP TX unit 304 and exiting the state 306.

If a control channel is not established, the method continues with the device determining whether it has exhausted its standardized communication protocols 308 (e.g., the ones it is capable of executing). If not, the process repeats with the device selecting another standardized protocol 300. If the standardized protocols are exhausted, the method continues with the device selecting a proprietary communication protocol 310. Note that the method may begin with proprietary protocols and if they are exhausted, then try standardized protocols. Further note that there may be no distinction between a standard protocol and a proprietary protocol such that the method attempts to find a usable protocol regardless of whether it is a standard or proprietary protocol.

The method continues with the device determining whether the device is synchronized via a control channel with the WP TX unit using the proprietary protocol 312. If yes, the method continues with the device establishing a control channel communication with the WP TX unit 314 using the proprietary protocol and exiting the state 318.

If a control channel is not established using a proprietary protocol, the method continues with the device determining whether it has exhausted its proprietary communication protocols 316 (e.g., the ones it is capable of executing). If not, the process repeats with the device selecting another proprietary protocol 310. If the proprietary protocols are exhausted, the method continues with the device exiting this state due to a failure 318.

Figure 13:
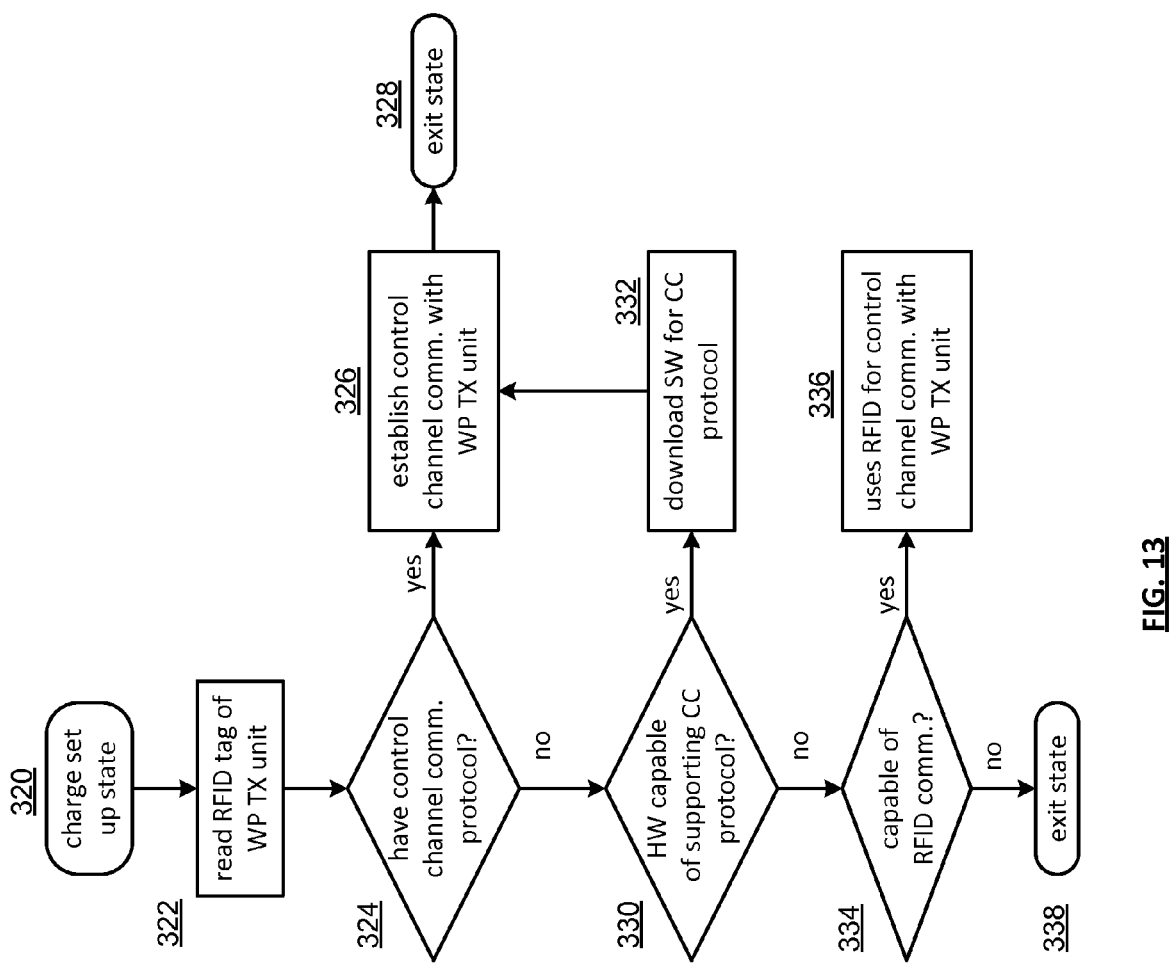
FIG. 13 is a logic diagram of another embodiment of a method for a charge set up state in accordance with the present invention.

FIG. 13 is a logic diagram of another embodiment of a method for a charge set up state 320 that begins with the device reading an RFID tag of the WP TX unit 322 to determine a desired control channel protocol. The method continues with the device determining whether it is capable of executing the desired control channel protocol 324. If yes, the method continues with the device establishing a control channel communication with the WP TX unit 326 and exiting the state 328.

If the device does not have the desired control channel protocol, the method continues with the device determining whether it includes the hardware to support the desired control channel protocol 330. For example, does it include the NFC circuitry, the RF circuitry, and/or the MMW circuitry to support the operating frequency, power requirements, transmission range, etc. of the desired control channel protocol. If yes, then the device is lacking the desired control channel protocol software and the method continues with the device downloading the software for the desired control channel protocol 332. After the device has the software, the method continues with the device establishing a control channel communication with the WP TX unit 326.

If the device does not have the hardware to support the desired control channel protocol, the method continues with the device determining whether it can use RFID as the control channel protocol with the WP TX unit 334. In an embodiment, the device requests that they use RFID, if the WP TX unit agrees, then the method continues with the device using RFID for the control channel with the WP TX unit 336. If the device cannot use RFID for the control channel, then the device exits the state due to a failure 338.

Figure 14:
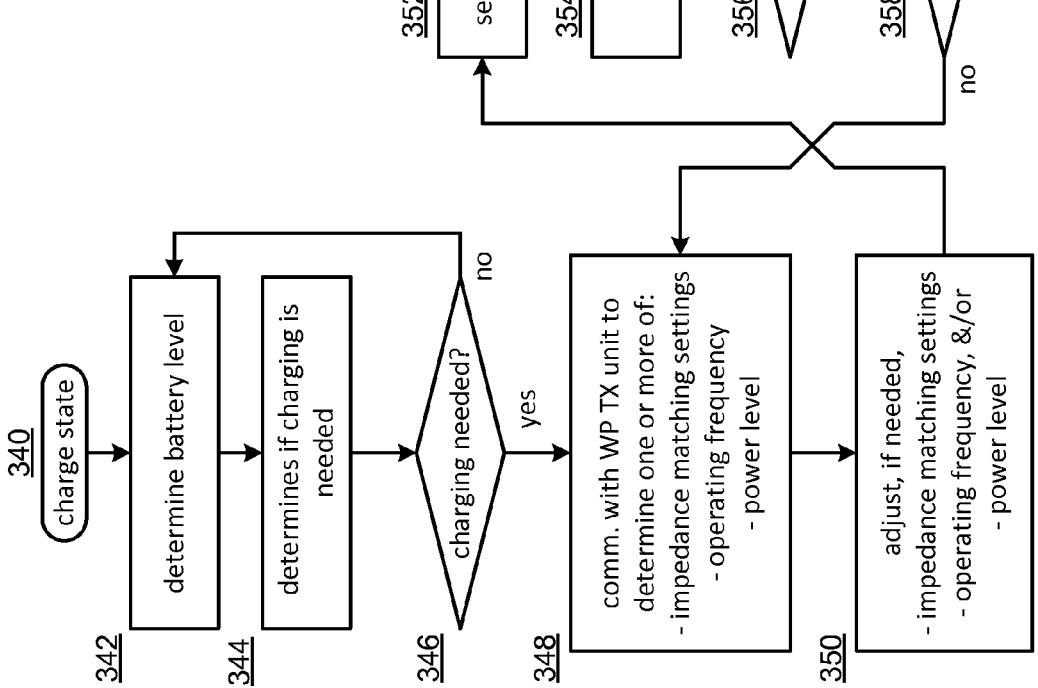
FIG. 14 is a logic diagram of an embodiment of a method for a charge state in accordance with the present invention.

FIG. 14 is a logic diagram of an embodiment of a method for a charge state 340 that begins with the device determining the level of its battery 342 (e.g., the battery life left based on the battery type, the power demands of the device, etc.). The method continues with the device determining if the battery needs charging 344-346. For example, has the power capacity of the battery been drained below a threshold, which may be based on battery life, not being fully charged, and/or some other criteria.

The method branches back to the beginning if the battery does not need charging and branches to the next step if it does. At the next step, the device communicates with the WP TX unit to determine one or more of: impedance matching settings, operating frequency, power level, number of coils, etc 348. The method continues with the device determining whether it needs to adjust one or more of the impedance of its power RX circuit, the operating frequency of the power RX circuit, the power level, etc. and making the appropriate adjustments as needed 350.

The method continues with the device setting charging parameters 352 (e.g., Vdd, current limits, trickle level, charge time intervals, etc.). The method continues with the device charging the battery and monitoring the charging 354 (e.g., the charging current and/or the charging voltage). The device also determines whether it is still in range of the WP TX unit 356. If so, the method continues with the device determining whether the charging is complete 358. If not, the process continues by setting (i.e., adjusting if needed in subsequent repetitions of the loop) the charging parameters 348. If the device is out of range, the method continues with the device exiting this state due to a failure 360. The device also exits this state 360 if the battery is charged.

Figure 15:
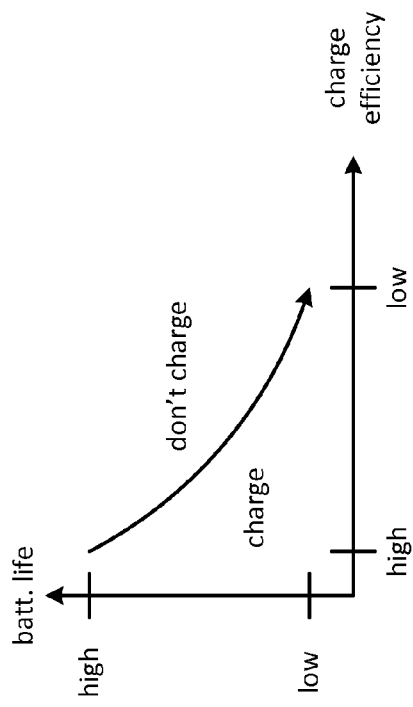
FIG. 15 is a diagram of an example of a graph of charge need versus charge efficiency in accordance with the present invention.

FIG. 15 is a diagram of an example of a graph of charge need versus charge efficiency that may be used by the device to determine whether charging is needed as mentioned in the logic diagram of FIG. 14. As can be inferred by the diagram of FIG. 15, the determination of whether charging is needed is a sliding scale that varies based on battery life and charging efficiency. As such, when the battery life is high, don't charge the battery unless it can be done efficiently. As the battery life diminishes, the need to charge it is greater, which, at some point, outweighs the desired for the charging to be done efficiently.

Figure 16:
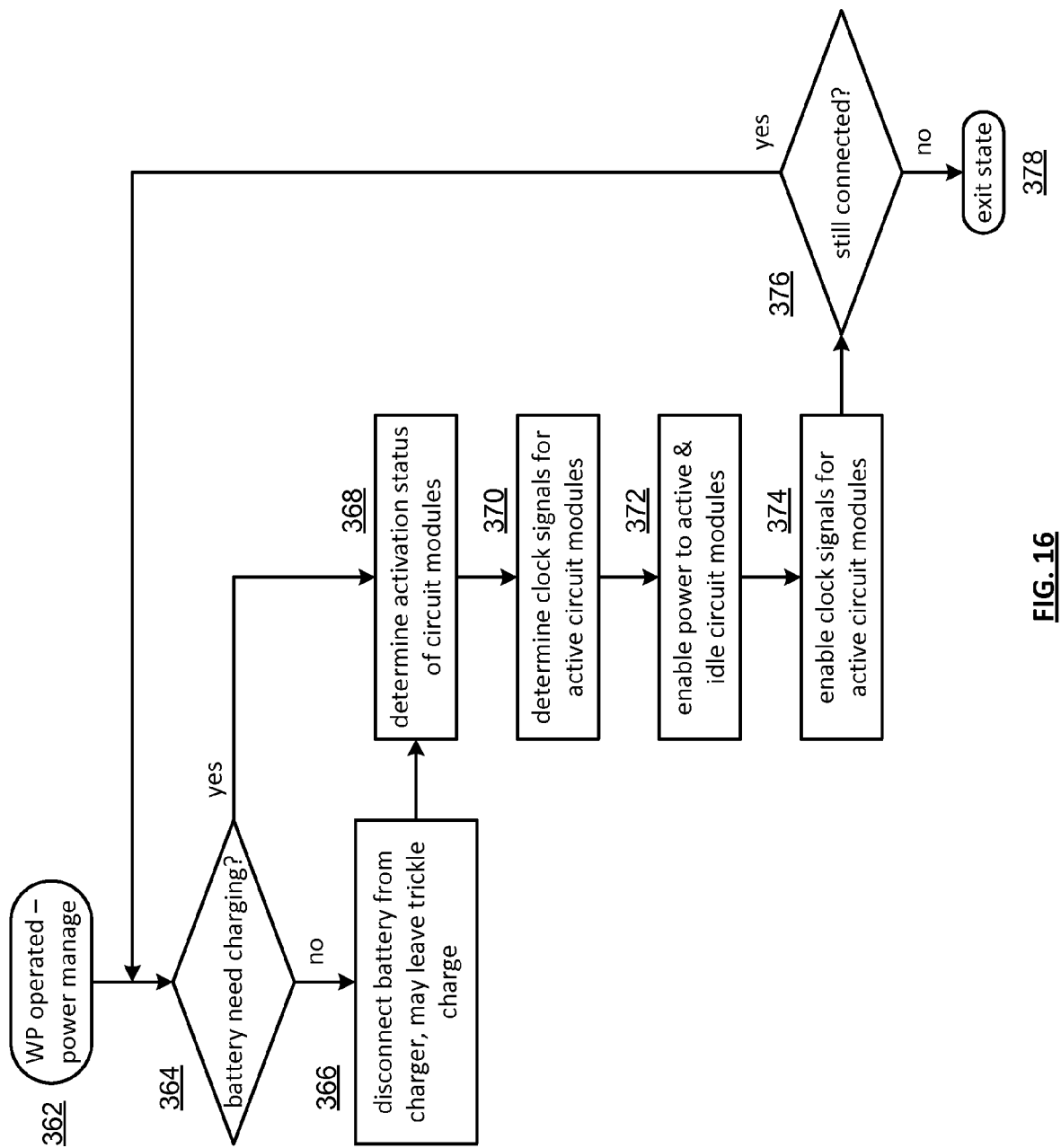
FIG. 16 is a logic diagram of an embodiment of a method for a wirelessly powered power management state in accordance with the present invention.

FIG. 16 is a logic diagram of an embodiment of a method for a wirelessly powered power management state 362 that begins with the device determining whether the battery needs charging 364. If not, the method continues with the device disconnecting the battery from the charger 366. The device may engage a trickle charge if desired or required per the battery charging requirements. The method continues with the device determining the activation status of the circuit modules 368 (e.g., disabled, active, idle, etc.). The method continues with the device determining clock signals for the active circuit modules 370 (e.g., select clock rate to just meet operational needs, which will typically be less than a maximum clock rate).

The method continues with the device determining supply voltages for the active and idle circuit modules 372. For example, the device may set the power levels for idle circuit modules at a level to provide just enough energy to determine whether the circuit module is to remain in the idle state or transition into an active state. As another example, the device may set the power level for active circuits modules to a level just sufficient enough for the circuit module to perform its task, which will typically be less than a maximum power level.

The method continues with the device enabling the clock signals for the active circuits and providing the selected power levels to the active and idle circuit modules 374. The method continues with the device determining whether it is still connected to the WP TX unit 376. If yes, the method repeats from the beginning. If not, the method continues with the device exiting the state 378. Note that in this state, power management of the device is a less critical task than when the device is battery operated. As such, the setting of the clock signal rates and power levels may be set near maximum values to enhance performance.

Figure 17:
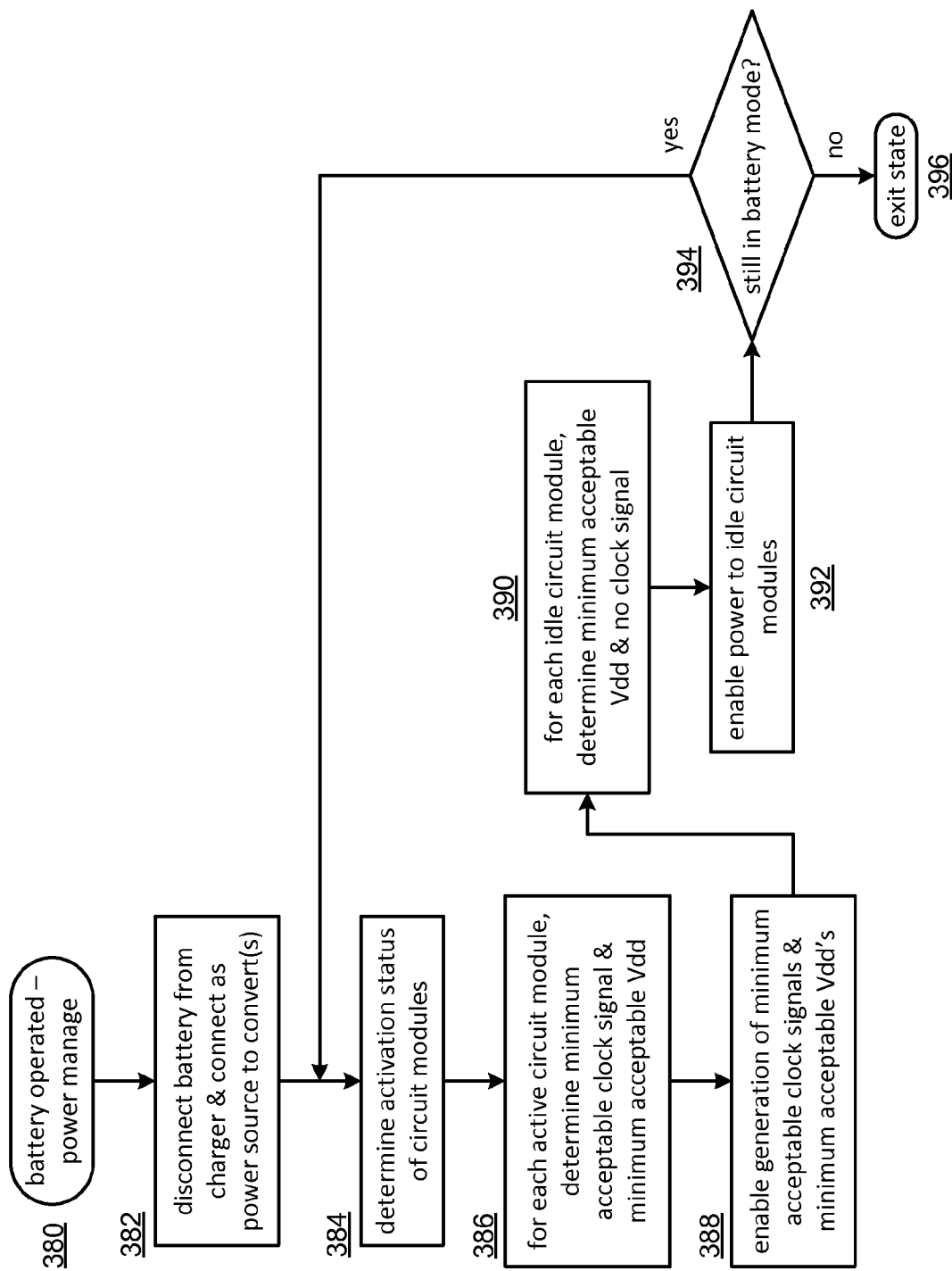
FIG. 17 is a logic diagram of an embodiment of a method for a battery powered power management state in accordance with the present invention.

FIG. 17 is a logic diagram of an embodiment of a method for a battery powered power management state 380 that begins with the device disconnecting the battery from the charger and connecting it as the primary power source 382. The method continues with the device determining activation status of the circuit modules 384 (e.g., disabled, active, idle, etc.). The method continues with the device determining, for each active circuit module, a minimum acceptable clock signal and a minimum acceptable supply voltage 386 (e.g., Vdd).

The method continues with the device enabling generation of the minimum acceptable clock signals by the clock generator and the minimum acceptable supply voltages by the converter 388. The method continues with the device determining, for each idle circuit module, a minimum acceptable idle supply voltage and no clock signal 390. The method continues with the device enabling generation of the idle supply voltage by the converter 392. The method continues with the device determining whether it is still in the battery mode 394. If yes, the method repeats. If not, the device exits this state 396.

Figure 18:
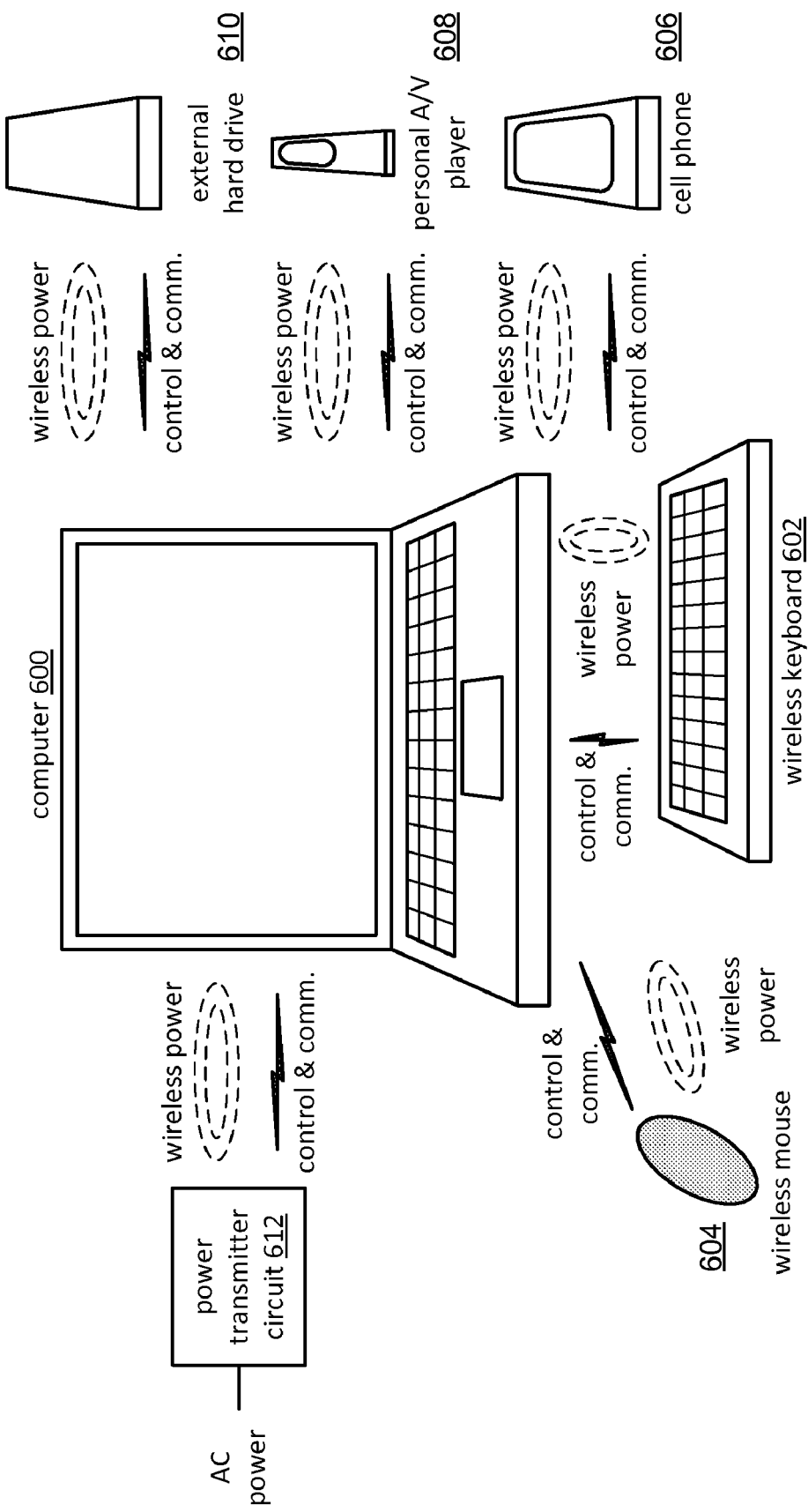
FIG. 18 is a schematic block diagram of an embodiment of a wireless power computer system in accordance with the present invention.

FIG. 18 is a schematic block diagram of an embodiment of a wireless power computer system that includes a computer 600, a wireless keyboard 602, a wireless mouse 604, a cell phone 606, a personal audio/video (A/V) player 608, an external hard drive 610, and potentially other peripheral computer devices (e.g., joy stick, touch pad, track ball, speakers, etc.). The computer 600 may be a laptop, a panel display computer (e.g., a tablet), a conventional computer, etc. and includes a wireless power module.

In this embodiment, the computer 600 is powered wirelessly via the power transmitter circuit 612 (i.e., a WP TX unit) and provides wireless power to the peripheral components (e.g., keyboard 602, mouse 604, cell phone 606, personal AV player 608, hard drive 610, etc.). The peripheral devices 602-610 may be wirelessly powered concurrently from the computer 600 and/or sequentially. Each of the peripheral devices 602-610 wirelessly communicates with the computer 600 using conventional wireless communication protocols (e.g., Bluetooth) and/or uses the WP control channel.

While FIG. 18 illustrates a computer system, the concepts apply to a more generic system. For example, a wireless power system may include a primary device (e.g., computer, television, monitor, cable set-top box, satellite set-top box, home electronic appliance, etc.) and at least one peripheral device (e.g., the peripheral devices of FIG. 35, audio and/or video entertainment components, remote controllers, etc.). The primary device includes a power conversion unit, a functional module, and a transceiver. The peripheral device includes a wireless power receiver, a peripheral unit, and a transceiver.

Within the primary device, the power conversion unit converts a power source into an electromagnetic signal. For example, the power conversion unit may include a power supply and a wireless power transmitter circuit. The power supply converts the power source (e.g., an AC voltage) into an output DC voltage. The wireless power transmitter circuit converts the output DC voltage into the electromagnetic signal. As another example, the power conversion unit includes a wireless power receiver circuit and a power conversion transmit circuit. The wireless power receiver circuit converts the power source (e.g., an input electromagnetic signal) into a supply voltage. The power conversion transmit circuit converts the supply voltage into the electromagnetic signal. In the latter example, the input electromagnetic signal may have a first frequency and the electromagnetic signal may have a second frequency to minimize interference therebetween.

The functional module of the primary device executes a function regarding peripheral information (e.g., communication protocol for the conveyance of the peripheral information, input data from the peripheral device, an input command from the peripheral device, output data for the peripheral device, and/or an output command for the peripheral device). For example, if the functional module is a central processing unit and the peripheral device is a user input device (e.g., touch screen, keypad, mouse, keyboard, etc.), the user input device may generate data and/or a command for execution by the central processing unit. As another example, if the functional module is memory and the peripheral device is a user output device, the memory provides data to the user output device for display (e.g., audible and/or visual).

The transceiver of the primary device communicates information regarding the electromagnetic signal with the transceiver of the peripheral device. The information regarding the electromagnetic signal includes control channel protocol, frequency of the electromagnetic signal, impedance matching parameters, resonant frequency tuning parameters, and/or other electromagnetic properties discussed herein.

The transceiver of the primary device also communicates the peripheral information with the transceiver of the peripheral device. In this regard, the transceivers are used for wireless power control channel communication and for peripheral device functional (e.g., data and/or commands) communication.

In addition to including a power conversion unit, a functional module, and a transceiver, the primary device may further include a battery, a battery charger, and a processing module. The battery charger utilizes the supply voltage to charge the primary battery as discussed with reference to one or more of the figures. The processing module coordinates the charging of the battery, the communicating the information regarding the electromagnetic signal, and the communicating the peripheral information.

The wireless power receiver circuit of the peripheral device converts the electromagnetic signal into a voltage as discussed with reference to one or more of the figures. The peripheral unit of the peripheral device processes the peripheral information. For example, the peripheral unit may generate input data for the primary device, wherein the peripheral information includes the input data. As another example, the peripheral unit may generate an input command for the primary device, wherein the peripheral information includes the input command. As another example, the peripheral unit may perform a function on output data from the primary device, wherein the peripheral information includes the output data. As another example, the peripheral unit may perform a function in accordance with an output command from the primary device, wherein the peripheral information includes the output command.

In addition to including a wireless power receiver, a peripheral unit, and a transceiver, the peripheral device may further include a battery, a battery charger, and a processing module. The battery charger utilizes the supply voltage to charge the peripheral battery. The processing module coordinates the charging of the battery, the communicating the information regarding the electromagnetic signal, and the communicating the peripheral information.

The primary device and/or the peripheral device may include an integrated circuit (IC) to support the above-described functions. For example, an IC may include at least a portion of the wireless power receiver circuit (e.g., one or more of the coil, capacitor, and diodes of the rectifying circuit may be off-chip), at least a portion of the battery charger (e.g., one or more of the switching transistors, the output filter capacitor, the inductor may be off-chip), the transceiver, and the processing module.

Figure 19:
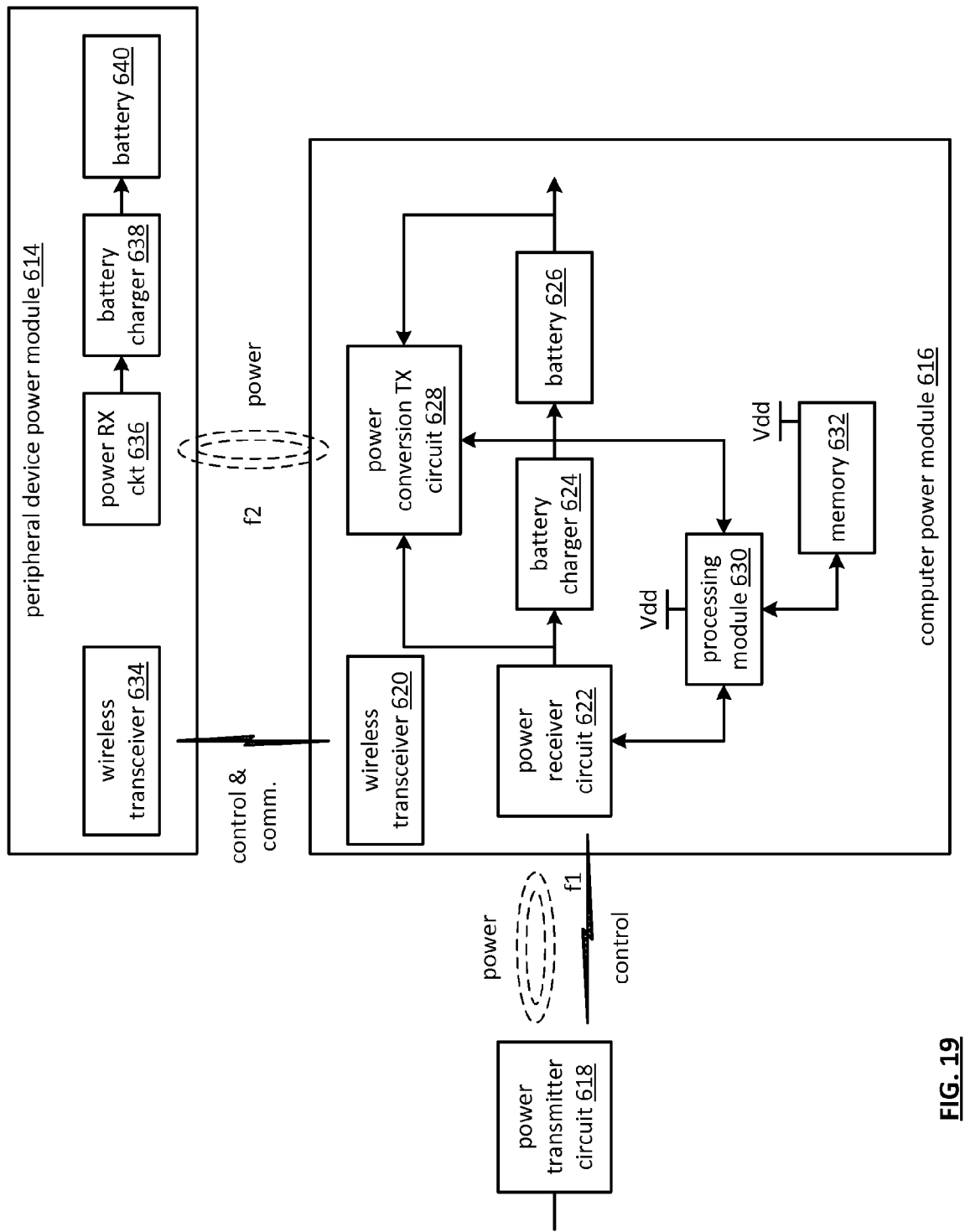
FIG. 19 is a schematic block diagram of an embodiment of power modules within a wireless power computer system in accordance with the present invention.

FIG. 19 is a schematic block diagram of an embodiment of power modules (e.g., computer power module 616 and peripheral device power module 614) within a wireless power computer system. The computer power module 616 includes a wireless transceiver 620, a power receiver circuit 622, a battery charger 624, a battery 626, a power conversion transmit (TX) circuit 628, a processing module 630, and memory 632. The peripheral device power module 614 includes a wireless transceiver 634 a power receive circuit (RX ckt) 636, a battery charger 638, and a battery 640.

In an example of operation, the power transmit circuit 618 generates a magnetic field that is received by the power receiver circuit 622 of the computer power module 616 to facilitate a wireless power transference. The power receiver circuit 622 generates a DC rail voltage in accordance with control signals provided by the processing module 630. The battery charger 624 converts the DC rail voltage into a battery charge voltage, which is supplied to the battery 626. The power conversion TX circuit 628 generates a magnetic field that is magnetically coupled to the power RX circuit 636 of the peripheral device power module 614. The power conversion TX circuit 628 may be sourced by the DC rail voltage when the computer power module 616 is proximal to the power transmitter circuit 618 or the battery 626 when the computer power module 616 is not proximal to the power transmitter circuit 618.

The power RX circuit of the peripheral device power module 636 generates a DC rail voltage from the magnetic field of the power conversion TX circuit 628. The battery charger 624 converts the DC rail voltage into a battery charger voltage, which is provided to the battery 626. The computer power module 616 communicates with the peripheral device power module 614 via the wireless transceivers 620, 634 (e.g., RF, MMW, and/or NFC) regarding wireless power matters (e.g., frequency selection, operating frequency, impedance matching settings, power levels, etc.). In addition, the wireless transceivers 620, 634 may be used to convey data between the peripheral device and the computer. For example, if the peripheral device is the wireless keyboard, the keyboard signaling may be conveyed to the computer via the wireless transceivers. Note that with multiple peripheral devices, each including a wireless transceiver, a local area network is created, which requires a network level coordinate of communications therein.

A power module (e.g., computer power module 616 and peripheral device power module 614) may include an integrated circuit (IC) to support its function. For example, the IC may include at least a portion of a wireless power receiver circuit (e.g., one or more of the coil, capacitor, and diodes of the rectifying circuit may be off-chip), at least a portion of a wireless power transmit circuit (e.g., one or more of the coil, capacitor, and the switching transistors of the DC-to-AC circuit may be off-chip), and the transceiver. The wireless power receiver circuit is operable to convert an electromagnetic signal into a voltage, wherein a wireless power transmitter unit generates the electromagnetic signal. The wireless power transmit circuit is operable to convert the voltage into a second electromagnetic signal. The transceiver communicates first information regarding the first electromagnetic signal, communicates second information regarding a second electromagnetic signal, and communicates peripheral information regarding execution of a function.

Figure 20:
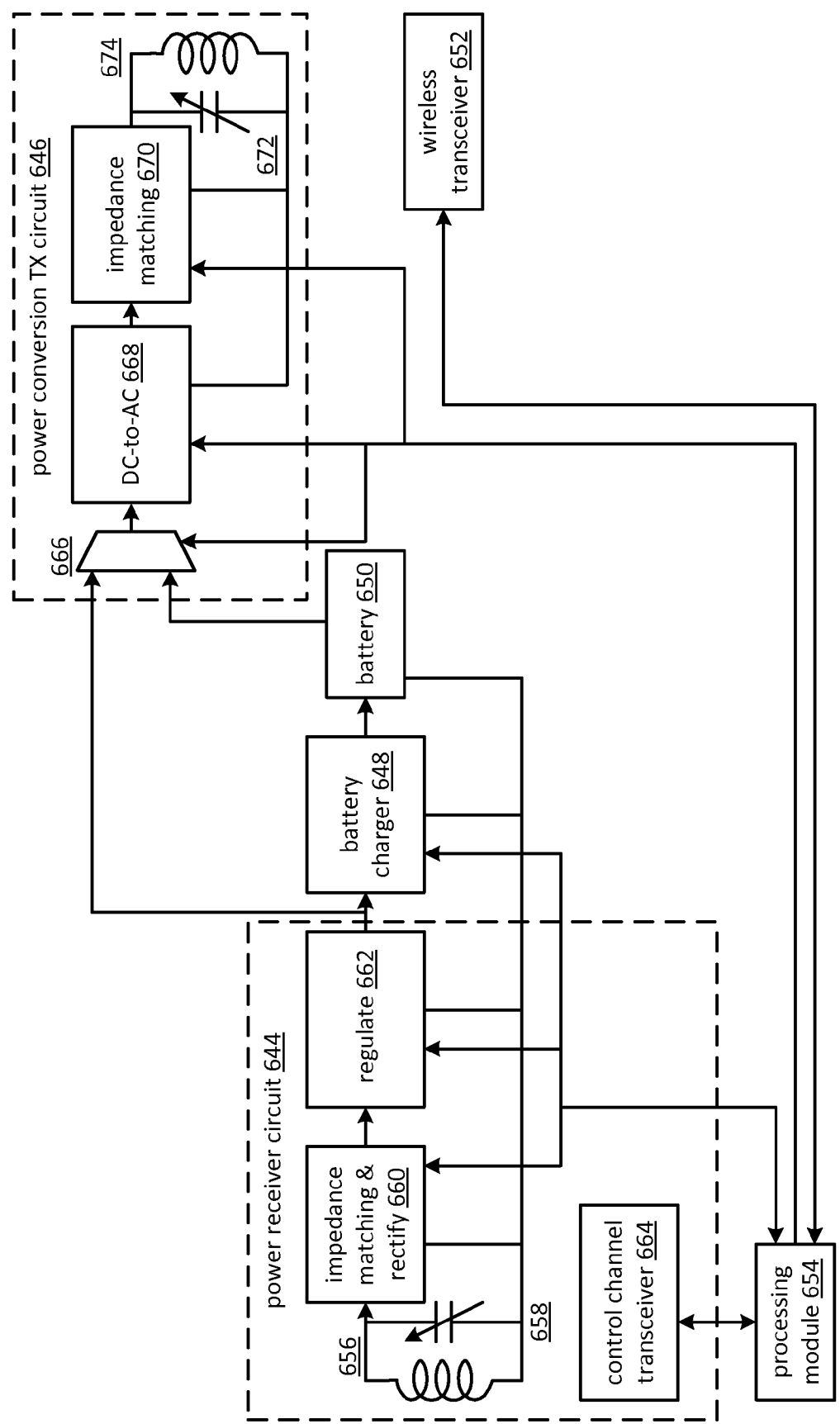
FIG. 20 is a schematic block diagram of an embodiment of a computer power module in accordance with the present invention.

FIG. 20 is a schematic block diagram of an embodiment of a computer power module 642 that includes the power receiver circuit 644, the battery charger 648, the battery 650, the power conversion TX circuit 646, the wireless transceiver 652, and the processing module 654. The power receiver circuit 644 includes the RX coil 656, an adjustable capacitor 658, the impedance matching & rectify circuit 660, the regulation circuit 662, and the control channel transceiver 664. The power conversion TX circuit 646 includes a multiplexer 666, a DC-to-AC converter 668, an impedance matching circuit 670, an adjustable capacitor 672, and a coil 674.

In an example of operation, the RX coil 656 of the power receiver circuit 644 generates an AC voltage from the magnetic field it receives from the TX coil of the WP TX unit. The impedance matching and rectify circuit 660 converts the AC voltage into a DC rail voltage that is regulated via the regulation circuit 662. The battery charger 648 uses the DC rail voltage to charge the battery 650.

The power conversion TX circuit 646 is powered by the DC rail voltage when the computer is receiving wireless power from the WP TX unit 646 and is powered by the battery 650 when the computer is in a battery operated mode (assuming the battery 650 has sufficient energy to charge peripheral devices). When in the WP mode, the DC-to-AC converter 668 converts the DC rail voltage into an AC voltage that is provided to the coil 674 via the impedance matching circuit 670. The coil 674 generates a magnetic field that is received by the RX coil of a peripheral device power module. In an embodiment, the AC voltage of the RX coil 656 of the power receiver circuit 644 of the computer power module 642 may have the same or a different frequency than the AC voltage of the TX coil 674 of the power conversion TX module 646.

When the computer is in the battery operated mode, the power conversion TX circuit 646 generates the magnetic field as described above if the battery 650 has sufficient power (e.g., a desired battery life level) to charge one or more peripheral devices. If the battery 650 does not have sufficient power, the power conversion TX circuit 646 is disabled.

Figure 21:
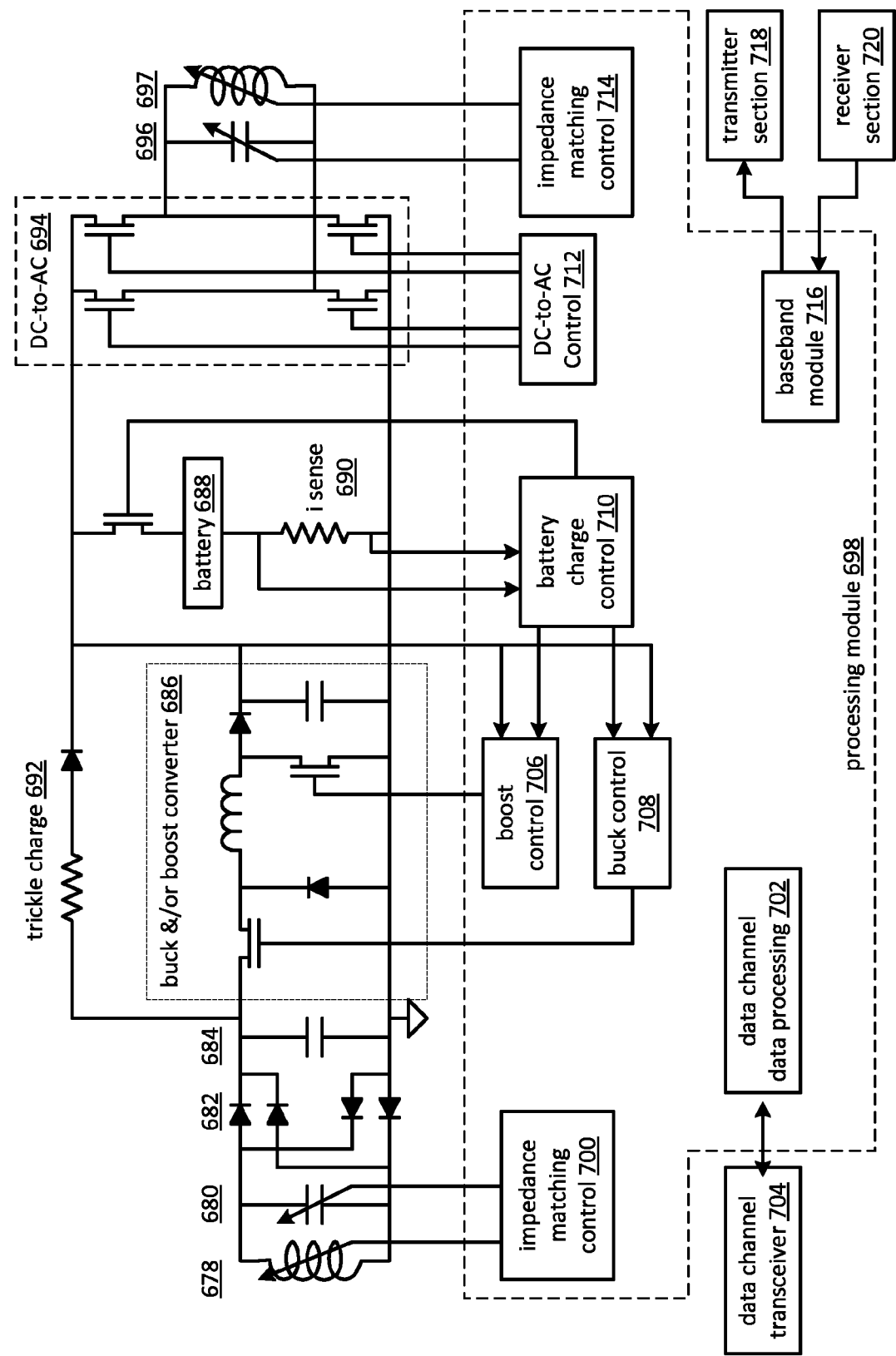
FIG. 21 is a schematic block diagram of another embodiment of a computer power module in accordance with the present invention.

FIG. 21 is a schematic block diagram of another embodiment of a computer power module 676 that includes the RX coil 678, an adjustable capacitor 680, rectifying diodes 682, a storage capacitor 684, a buck and/or boost converter 686, the battery 688, a battery current sense 690, a trickle charge circuit 692, the DC-to-AC converter 694, another adjustable capacitor 696, and the processing module 698. The processing module 698 is configured to implement an RX impedance matching control module 700, the control channel processing module 702, a boost control module 706, a buck control module 708, a battery charger control module 710, a DC-to-AC control module 712, and a TX impedance matching control module 714. In addition, the processing module 698 may implement the baseband processing 716 for the wireless transceiver. Note that the processing module 698 and one or more other components may be implemented on one or more integrated circuits.

In an example of operation of the back half of the circuit, the DC-to-AC module 694 receives the DC rail voltage produced by the buck and/or boost converter 686. The DC-to-AC module 694 includes a full bridge inverter topology to excite the coil 697. The DC-to-AC control module 712 generates the switching signals to drive the DC-to-AC module 694 at a desired frequency. The impedance matching control circuit 714 adjusts the impedance of the capacitor 696 and/or coil 697 to a desired resonance and/or quality factor. As an example, the impedance matching control circuit 714 may tune the capacitor 696 and coil 697 to resonate at the switching frequency of the DC-to-AC converter 694, to be an underdamped circuit, or an over-damped circuit. In an alternate embodiment, the DC-to-AC converter 694 may include a half bridge inverter topology. Note that the front half of the circuit operates in a similar manner as described with reference to FIG. 10.

Figure 22:
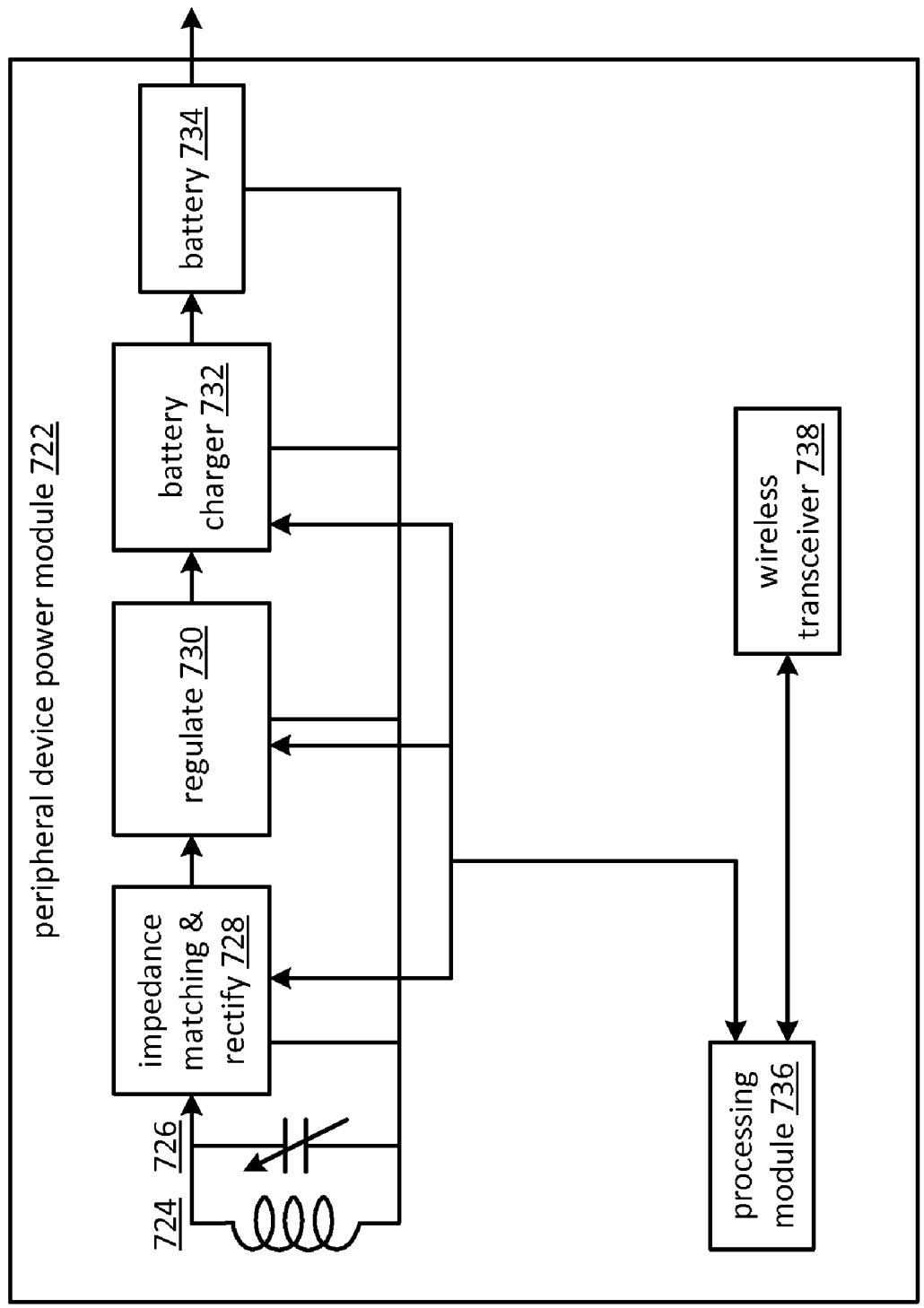
FIG. 22 is a schematic block diagram of an embodiment of a peripheral device power module in accordance with the present invention.

FIG. 22 is a schematic block diagram of an embodiment of a peripheral device power module 722 that includes the RX coil 724, an adjustable capacitor 726, the impedance matching and rectifying circuit 728, the regulation circuit 730, the battery charger 732, the battery 734, the processing module 736, and the wireless transceiver 738.

In an example of operation, the RX coil 724 generates an AC voltage from the magnetic field it receives from the TX coil of the computer power module. The impedance matching and rectify circuit 728 converts the AC voltage into a DC rail voltage that is regulated via the regulation circuit 730. The battery charger 732 uses the DC rail voltage to charge the battery 734.

Figure 23:
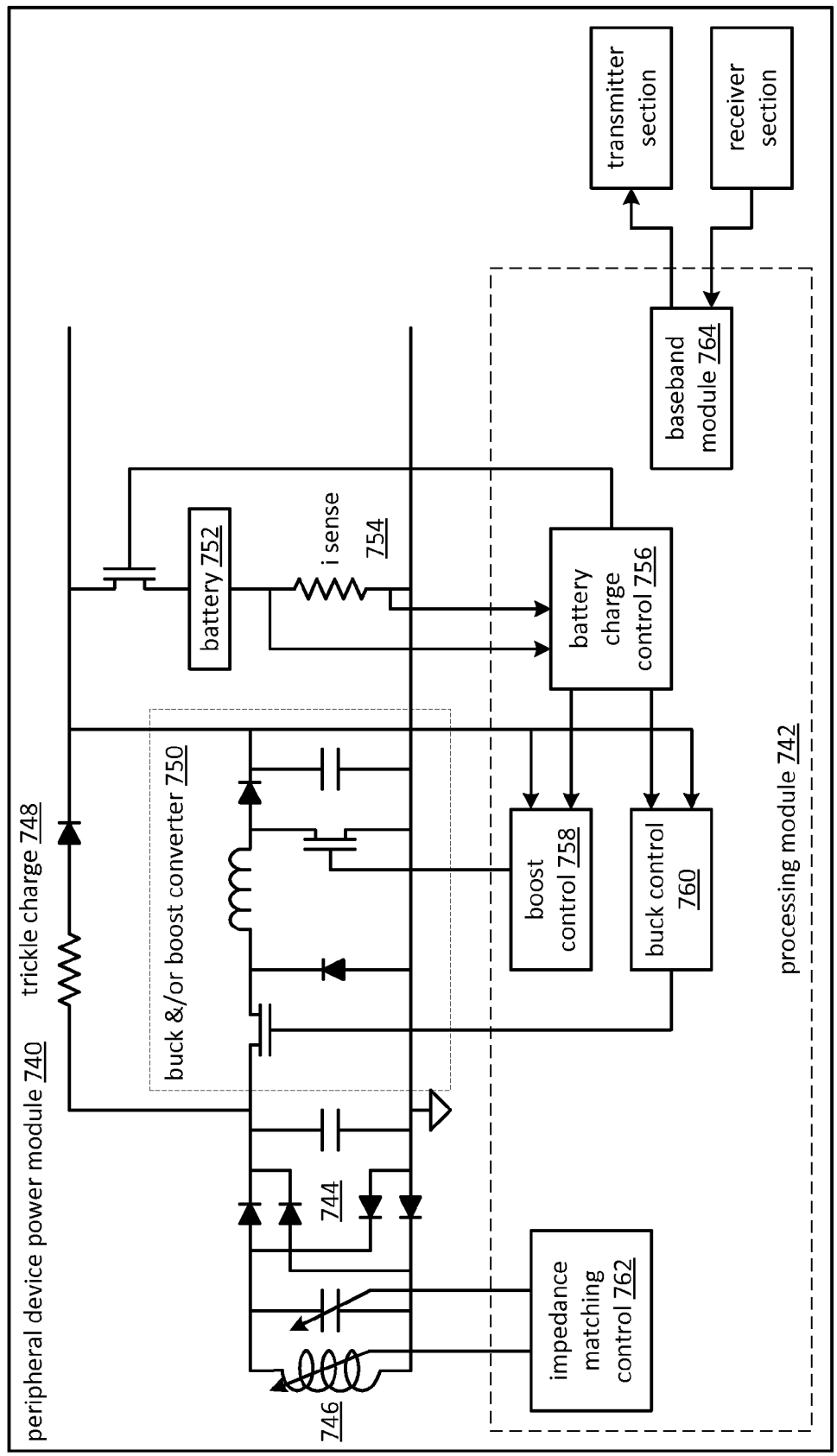
FIG. 23 is a schematic block diagram of another embodiment of a peripheral device power module in accordance with the present invention.

FIG. 23 is a schematic block diagram of another embodiment of a peripheral device power module 740 that includes the processing module 742, the rectify and impedance matching circuit 744 (e.g., capacitors and diodes), the RX coil 746, a buck &/or boost converter 750, a trickle charge circuit 748, a battery 752, and a battery current sensor 754. The processing module 742 implements a battery charger controller 756, a boost controller 758, a buck controller 760, an impedance matching circuit 762, and an RF/MMW and/or NFC baseband processing module 764. Note that the processing module 742 may be fabricated on a single integrated circuit or on a multiple integrated circuit with one or more of the components of the converter 750, the rectifier circuit 744, the trickle charge circuit 748, and/or the battery current sense 754.

In an example of operation, the RX coil 746 (which may include one or more adjustable inductors) receives a magnetic field from the computer power module and creates an AC voltage therefrom. The adjustable capacitor 744 is tuned (alone or in conjunction with the RX coil 746) to a desired resonance, impedance, and/or quality factor to facilitate the creation of the AC voltage. The full bridge rectifier 744 (e.g., the diodes) rectifies the AC voltage to produce a rectified voltage that is filtered by the capacitor 744 to produce a DC rail voltage (e.g., 3-20 volts).

The buck and/or boost converter 750 is enabled in a buck converter mode when the DC voltage rail is to be stepped down to produce battery charge voltage (and the supply voltage Vdd for the device) and is enabled in boost converter mode when the DC rail voltage is to be stepped up to produce the battery charge voltage (and the supply voltage Vdd). Note that when the buck and/or boost converter 750 is in the boost mode, the buck transistor is enabled. Further note that the buck and/or boost converter 750 may include multiple inductors, transistors, diodes, and capacitors to produce multiple supply voltages.

When the battery 752 is charging, the battery charge control module 756 monitors the battery 752 current and voltage to insure charging is in accordance with the charging requirements of the battery 752. When the battery 752 is charged, the battery 752 is disconnected from the converter 750 (which may be disable or enabled to provide Vdd) and the battery 752 may be trickle charged 748. Note that when the WP is lost, the battery 752 is coupled to provide the power for the device.

Figure 24:
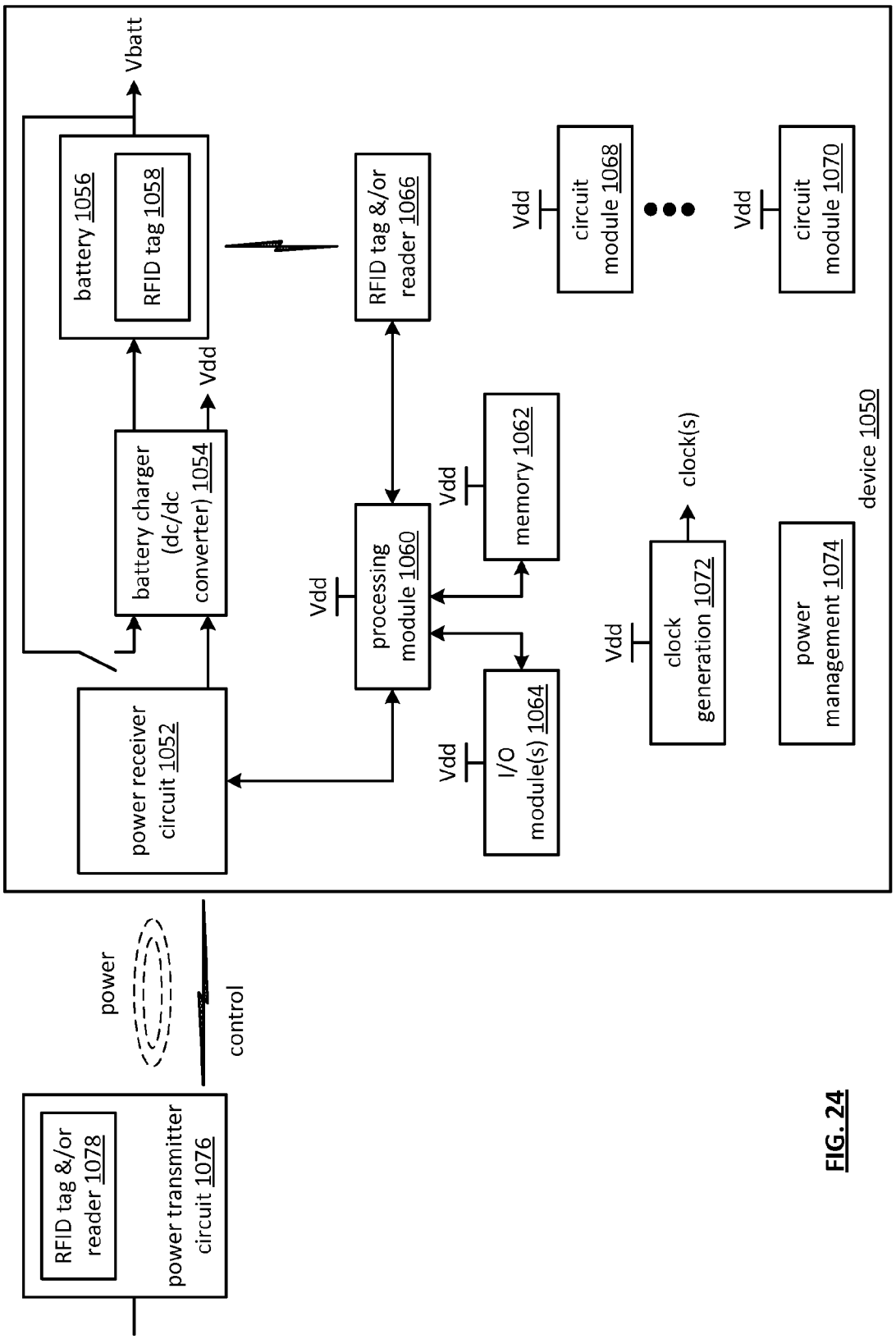
FIG. 24 is a schematic block diagram of another embodiment of a wireless power system in accordance with the present invention.

FIG. 24 is a schematic block diagram of another embodiment of a wireless power system that includes the WP TX unit and a device 1050. In this diagram, the power TX circuit and the RFID tag and/or reader of the WP TX unit is shown. The device 1050 includes the power RX circuit 1052, a battery charger &/or DC-to-DC converter 1054, a battery 1056 (which includes an RFID tag 1058), the processing module 1060, memory 1062, a plurality of input/output (I/O) modules 1064, a plurality of circuit modules 1068-1070, a clock generation unit 1072, an RFID tag and/or reader 1066, and a power management unit 1074.

In an example of operation, after the WP TX unit and the device 1050 have established communication, the WP TX unit generates a magnetic field that is received by the power RX circuit 1052 of the device 1050. The power RX circuit 1052 generates an AC voltage from the magnetic field, rectifies the AC voltage to produce a rectified voltage, and filters to the rectified voltage to produce a DC voltage rail (e.g., V+ and V−). The power RX circuit 1052 may be tuned based on control signals provided by the processing module 1060. The tuning includes adjusting the quality factor of the circuit, adjusting impedance, current limiting, etc.

The battery charger 1054 converts the DC voltage rail into a battery charge voltage, which it provides to the battery 1056. The battery charger 1054 monitors the charging to insure proper charging in accordance with the type of battery and, once the battery 1056 is charged, may implement a trickle charge. Note that the processing module 1060 may provide control signals to the battery charger 1054 to regulate the charging in accordance with the type of battery 1056.

The DC-to-DC converter 1054 converts the battery voltage (e.g., 1.5 volts, 4.2 volts, etc.) into one or more supply voltages (e.g., 1 volt, 2.2 volts, 3.3 volts, 5 volts, 12 volts, etc.). The DC-to-DC converter 1054 provides the supply voltages to one or more of the other modules under the direction of the power management module 1074. In general, the power management module 1074 functions to control power consumption by the device 1050 to an optimal level (e.g., balancing of performance and battery life). In this regard, the power management module 1074 may treat each module as a separate power island that can be individually controlled. For example, when a circuit module 1068-1070 is inactive, the power management module 1050 may remove power from the circuit module 1068-1070. As another example, the power management module 1074 may reduce the voltage provided to a circuit module 1068-1070 when the circuit module 1068-1070 does not need to operate at its maximum potential.

In addition to controlling the supply voltage to each power island, the power management module 1074 may control the clock signals provided to each circuit module 1068-1070 that uses a clock signal. For example, when a circuit 1068-1070 is idle, the power management module 1074 may provide a reduced supply voltage to the circuit module 1068-1070, but disable the clock signal provided to the circuit module 1068-1070. In this way, minimal power is consumed, but the circuit module 1068-1070 may be quickly activated when it is needed. As another example, the power management module 1074 may reduce the frequency of a clock signal for a circuit module 1068-1070 when the circuit module 1068-1070 does not need to operate at its maximum potential.

To facilitate charging of the battery 1056, the RFID tag 1058 of the battery 1056 stores information regarding effective and efficient charging of the battery 1056. For example, the information may indicate the type of battery 1056, the number of times the battery 1056 has been charged, the desired charging current, the desired charging voltage, the desired charging duration, time base changes in the charge current, time based changes in the charging voltage, trickle charge requirements, etc. In this manner, the battery 1056 provides information regarding its optimal charging such that the device 1050 may configure itself to optimally charge the battery 1056.

Figure 25:
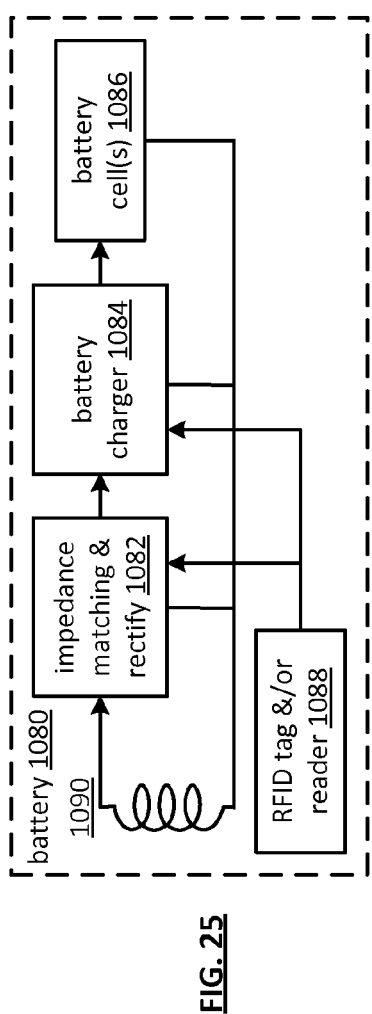
FIG. 25 is a schematic block diagram of an embodiment of a wirelessly chargeable battery in accordance with the present invention.

FIG. 25 is a schematic block diagram of an embodiment of a wirelessly chargeable battery 1080 that includes a coil 1090, an impedance matching & rectify circuit 1082, a battery charger 1084, battery cells 1086, and an RFID tag and/or reader 1088. Note that the physical size of the components is dependent on the operating frequency of the charger 1084 and the charging requirements of the battery 1086.

In an example of operation, the coil 1090 of the power RX unit is receives a magnetic field from the TX coil and creates an AC voltage therefrom. The impedance matching and rectify circuit 1082 adjusts the impedance of the coil 1090 and rectifies the AC voltage of the RX coil 1090 to produce a DC rail voltage that is regulated via the regulation circuit (not on figure). Note that impedance matching may be omitted from the in-battery battery charging circuit. The battery charger 1084 adjusts the voltage to a desired charging voltage and monitors the charging current to insure proper charging.

Figure 26:
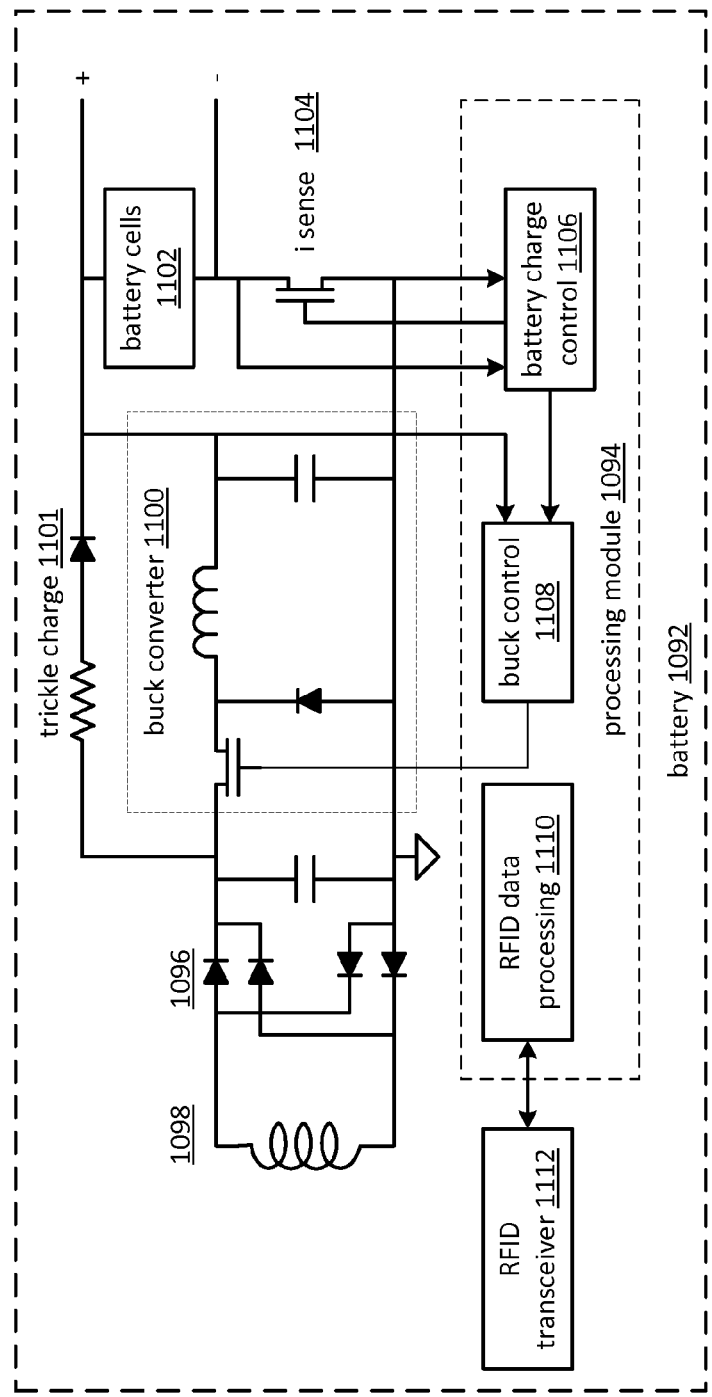
FIG. 26 is a schematic block diagram of another embodiment of a wirelessly chargeable battery in accordance with the present invention.

FIG. 26 is a schematic block diagram of another embodiment of a wirelessly chargeable battery 1092 that includes the processing module 1094, the rectify and impedance matching circuit 1096 (e.g., capacitors and diodes), the RX coil 1098, a buck (&/or boost) converter 1100, a trickle charge circuit 1101, battery cells 1102, and a battery current sensor 1104. The processing module 1094 implements a battery charger controller 1106, a buck (&/or boost) controller 1108, and an RFID data processing module 1110. Note that the processing module 1094 may be fabricated on a single integrated circuit or multiple integrated circuit with one or more of the components of the converter 1100, the rectifier circuit 1096, the trickle charge circuit 1101, and/or the battery current sense 1104.

In an example of operation, the RX coil 1098 (which may include one or more adjustable inductors) receives a magnetic field from the WP TX unit and creates an AC voltage therefrom. The full bridge rectifier 1096 (e.g., the diodes) rectify the AC voltage to produce a rectified voltage that is filtered by the capacitor to produce a DC rail voltage (e.g., 3-20 volts). The buck (and/or boost) converter 1100 is enabled to step down the DC voltage rail to produce battery charge voltage (or as a boost converter to step up the DC rail voltage to produce the battery charge voltage).

When the battery 1902 is charging, the battery charge control module 1106 monitors the battery current and voltage to insure charging is in accordance with the charging requirements of the battery 1096. When the battery 1092 is charged, the battery 1092 is disconnected from the converter 1100 (which is disabled) and the battery 1102 may be trickle charged.

Figure 27:
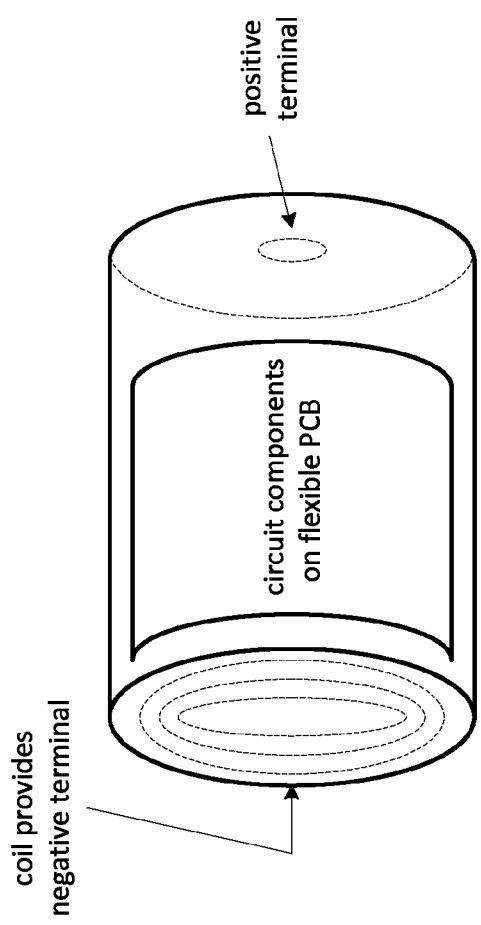
FIG. 27 is a diagram of an embodiment of a wirelessly chargeable battery in accordance with the present invention.

FIG. 27 is a diagram of an embodiment of a wirelessly chargeable battery that includes the components shown in FIG. 25 and/or FIG. 26. In this illustration, the RX coil is fabricated in the negative terminal and/or the positive terminal. The other components may be implemented on a flexible circuit board that conforms to the battery's shell or casing.

Figure 28:
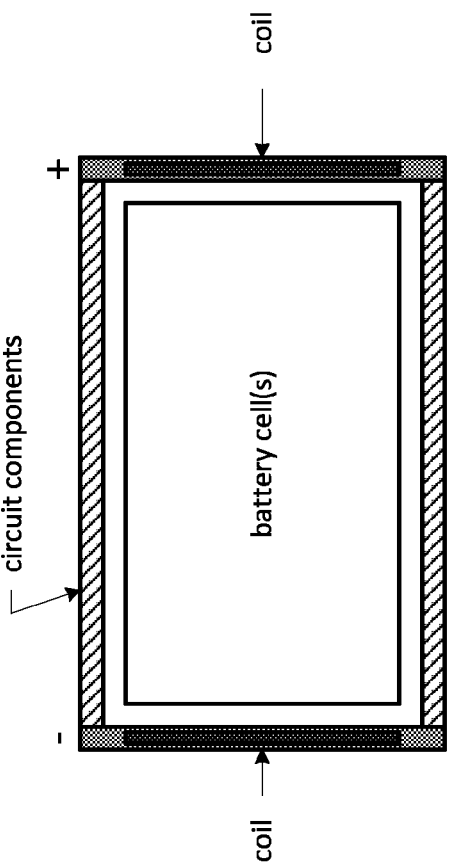
FIG. 28 is a diagram of another embodiment of a wirelessly chargeable battery in accordance with the present invention.

FIG. 28 is a diagram of another embodiment of a wirelessly chargeable battery that includes the components shown in FIG. 25 and/or FIG. 26. In this illustration, the RX coil is fabricated in the negative terminal and the positive terminal. The other components may be implemented on a flexible circuit board that conforms to the battery's shell or casing.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A battery comprises:
a positive terminal;
a negative terminal;
one or more rechargeable cells operably coupled to the positive terminal and to the negative terminal;
a voltage sensing circuit operable to determine a voltage of the one or more rechargeable cells; and
a radio frequency identification (RFID) tag that includes:
a transceiver section having a coil integrated into at least one of the positive terminal and the negative terminal, wherein the coil transceives electromagnetic signals within a given frequency band and, at direct current (DC), is a conductive element of the at least one of the positive terminal and the negative terminal;
memory for storing battery information and battery charging parameters; and
a processing module operable to:
obtain the voltage;
determine battery charging requirements based on at least one of the voltage, the battery charging information, and the battery charging parameters; and
communicate the battery charging requirements via the transceiver section.

2. The battery of claim 1, wherein the battery information comprises at least one of:
battery charging parameters;
battery charging history;
age of the battery; and
remaining rechargeable life of the battery.

3. The battery of claim 1, wherein the battery charging requirements comprises at least one of:
battery charging parameters; and
level of need for battery charging.

4. The battery of claim 1 further comprises:
a wireless power coil operable to generate an alternating current (AC) voltage from a wireless power electromagnetic field; and
a battery charging circuit, when operable, to:
convert the AC voltage into a battery charging voltage; and charge the one or more rechargeable cells via the battery charging voltage.

5. The battery of claim 1 further comprises:
a flexible substrate for supporting the RFID circuit and the voltage sensing circuit; and
a casing that encases the one or more rechargeable cells and the flexible substrate.

6. A battery comprises:
one or more rechargeable cells;
a wireless power coil operable to generate an alternating current (AC) voltage from a wireless power electromagnetic field; and
a battery charger circuit operable to:
generate a battery charge voltage from the AC voltage in accordance with a battery charge control signal;
when enabled, charge the one or more rechargeable cells via the battery charge voltage; and
wherein the battery charger circuit comprises output coupling circuitry operable to:
provide the battery charge voltage to the one or more rechargeable cells;
disconnect the one or more rechargeable cells from a terminal of the battery when the wireless power electromagnetic field is detected; and
connect an output of the battery charger circuit to the terminal when the wireless power electromagnetic field is detected.

7. The battery of claim 6 further comprises:
a radio frequency identification (RFID) module operable to:
generate the battery charge control signal; and
communicate with a wireless power transmitter device.

8. The battery of claim 6, wherein the battery charger circuit comprises:
a voltage sensing circuit operable to determine a voltage of the one or more rechargeable cells;
a detection circuit operable to detect the wireless power electromagnetic field; and
a processing module operable to enable the charging of the one or more rechargeable cells based on the voltage and the detection of the wireless power electromagnetic field.

9. The battery of claim 6 further comprises:
a positive terminal operably coupled to the one or more rechargeable cells; and
a negative terminal operably coupled to the one or more rechargeable cells, wherein the wireless power coil is integrated into at least one of the positive terminal and the negative terminal.

10. The battery of claim 9, wherein:
the coil transceives electromagnetic signals within a given frequency band; and
at direct current (DC), is a conductive element of the at least one of the positive terminal and the negative terminal.

11. The battery of claim 6 further comprises:
a flexible substrate for supporting at least a portion of the battery charger circuit; and
a casing that encases the one or more rechargeable cells and the flexible substrate.

12. The battery of claim 6, further comprising:
memory for storing battery information comprising at least one of:
battery charging parameters;
battery charging history;
age of the battery; and
remaining rechargeable life of the battery.

13. A battery circuit module comprises:
a wireless power coil operable to generate an alternating current (AC) voltage from a wireless power electromagnetic field;
a battery charger circuit operable to:
generate a battery charge voltage from the AC voltage in accordance with battery charge information; and
when enabled, charge the one or more rechargeable cells via the battery charge voltage; and
a radio frequency identification (RFID) module operable to:
communicate with a wireless power transmitter device;
generate the battery charge information based on, at least in part, the communication with the wireless power transmitter device; and
a processing module operable to:
process detection of the wireless power electromagnetic field;
process determining a voltage of a battery;
enable the charging of the battery based on the voltage and the detection of the wireless power electromagnetic field;
process a baseband portion of the communication with the wireless power transmitter device; and
generate the battery charge information.

14. The battery circuit module of claim 13, wherein the battery charger circuit comprises:
a voltage sensing circuit operable to determine a voltage of a battery;
a detection circuit operable to detect the wireless power electromagnetic field; and
a processing module operable to enable the charging of the battery based on the voltage and the detection of the wireless power electromagnetic field.

15. The battery circuit module of claim 13 further comprises:
a flexible substrate for supporting at least a portion of the battery charger circuit and the RFID module.

16. The battery circuit module of claim 13, wherein the RFID module comprises:
a coil;
a transceiver section coupled to the coil;
memory for storing the battery charge information that includes at least one of battery information and battery charging parameters; and
a processing module operable to process the battery charging information.

17. The battery circuit module of claim 16 further comprises:
the coil integrated into the wireless power coil.

18. The battery circuit module of claim 16, wherein the battery information comprises at least one of:
battery charging history;
age of the battery; and
remaining rechargeable life of the battery.

19. The battery circuit module of claim 13 wherein the wireless power coil is integrated into a terminal of a battery to be charged.

20. The battery circuit module of claim 19, wherein:
the wireless power coil transceives electromagnetic signals within a given frequency band; and
at direct current (DC), is a conductive element of the at least one of the terminal.

* * * * *